US011334905B2

(12) United States Patent
Boone et al.

(10) Patent No.: US 11,334,905 B2
(45) Date of Patent: May 17, 2022

(54) SYSTEMS AND METHODS FOR GATED OFFER ELIGIBILITY VERIFICATION

(71) Applicant: SheerID, Inc., Portland, OR (US)

(72) Inventors: Alexander R. Boone, Raleigh, NC (US); Jay B. Roberts, Eugene, OR (US)

(73) Assignee: SheerID, Inc., Portland, OR (US)

(*) Notice: Subject to any disclaimer, the term of this patent is extended or adjusted under 35 U.S.C. 154(b) by 78 days.

(21) Appl. No.: 16/599,046

(22) Filed: Oct. 10, 2019

(65) Prior Publication Data

US 2021/0110425 A1    Apr. 15, 2021

(51) Int. Cl.
*G06Q 30/00* (2012.01)
*G06Q 30/02* (2012.01)
*H04L 9/06* (2006.01)

(52) U.S. Cl.
CPC ..... *G06Q 30/0236* (2013.01); *G06Q 30/0239* (2013.01); *H04L 9/0643* (2013.01)

(58) Field of Classification Search
CPC ............ G06Q 30/0236; G06Q 30/0239; H04L 9/0643
See application file for complete search history.

(56) References Cited

U.S. PATENT DOCUMENTS

| | | | |
|---|---|---|---|
| 7,181,017 B1 | 2/2007 | Nagel et al. | |
| 7,519,591 B2 | 4/2009 | Landi et al. | |
| 8,131,738 B2 | 3/2012 | Gerber | |
| 9,300,643 B1 | 3/2016 | Doane | |
| 9,544,134 B2 | 1/2017 | Aissi et al. | |
| 10,943,246 B1* | 3/2021 | Biggs | G06Q 30/0222 |
| 2008/0172560 A1* | 7/2008 | Hughes | H04L 63/12 |
| | | | 713/176 |
| 2009/0006260 A1* | 1/2009 | Mishra | H04L 9/3236 |
| | | | 705/59 |
| 2009/0063351 A1 | 3/2009 | Schmeyer et al. | |
| 2010/0027969 A1* | 2/2010 | Alattar | G07B 11/00 |
| | | | 386/252 |
| 2020/0186355 A1* | 6/2020 | Davies | H04L 9/3239 |

OTHER PUBLICATIONS

Dorbian, Iris, Voyager Capital leads 5.3 mln round for SheerID, peHUB, Sep. 30, 2015 (Year: 2015).*

(Continued)

*Primary Examiner* — Matthew L Hamilton
(74) *Attorney, Agent, or Firm* — McCoy Russell LLP

(57) ABSTRACT

Systems and methods for automatically determining consumer eligibility for a gated offer while reducing data exposure, are herein disclosed. In one example, a method for automatically determining consumer eligibility for a gated offer using a hashed dataset comprises, receiving an eligibility claim from a requester, receiving credentials from a consumer, selecting a verification source based on the eligibility claim and the credentials, determining an eligibility status of the eligibility claim by comparing the credentials against a hashed dataset of the verification source, and transmitting the eligibility status to the requester. In this way, a verification platform may determine consumer eligibility to a gated offer using hashed data, without holding the underlying personal data of the consumer, thereby reducing data exposure of the consumer.

4 Claims, 8 Drawing Sheets

(56) References Cited

OTHER PUBLICATIONS

Boone, A., "Systems and Methods for Gated Offer Eligibility Verification," U.S. Appl. No. 16/599,027, filed Oct. 10, 2019, 74 pages.
Boone, A. et al., "Systems and Methods for Gated Offer Eligibility Verification," U.S. Appl. No. 16/599,054, filed Oct. 10, 2019, 74 pages.
European Patent Office, Extended European Search Report Issued in Application No. 20201089.8, dated Nov. 25, 2020, Germany, 9 pages.
"SheerID Implementation Guide," SheerID Website, Available Online at https://www.sheerid.com/wp-content/uploads/2017/11/sheerid-implementation-guide.pdf, Available as Early as Sep. 8, 2016, 13 pages.
"SheerID Technical Overview of Verification Services," SheerID Website, Retrieved from Internet Archive Website (without header), Available Online at https://web.archive.org/web/20180402164656/https://www.sheerid.com/about-sheerid-platform/. Available as Early as Apr. 2, 2018, 7 pages.
"SheerID Technical Overview of Verification Services," SheerID Website, Retrieved from Internet Archive Website (with header), Available Online at https://web.archive.org/web/20180402164656/https://www.sheerid.com/about-sheerid-platform/. Available as Early as Apr. 2, 2018, 7 pages.

\* cited by examiner

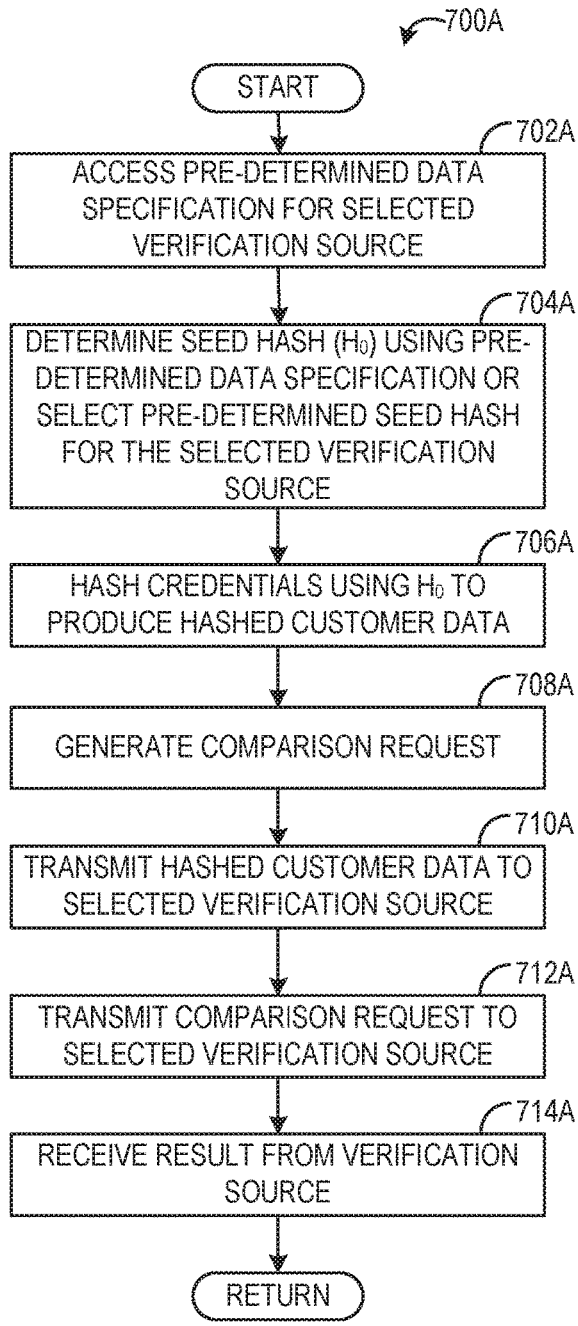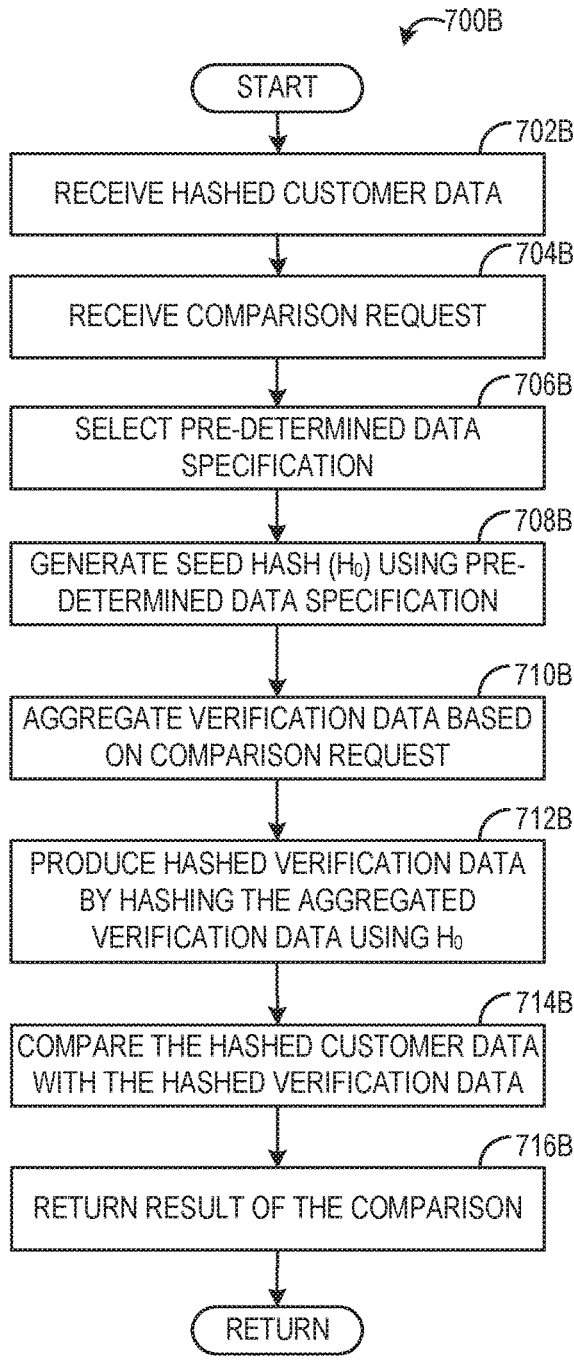
FIG. 7A
FIG. 7B

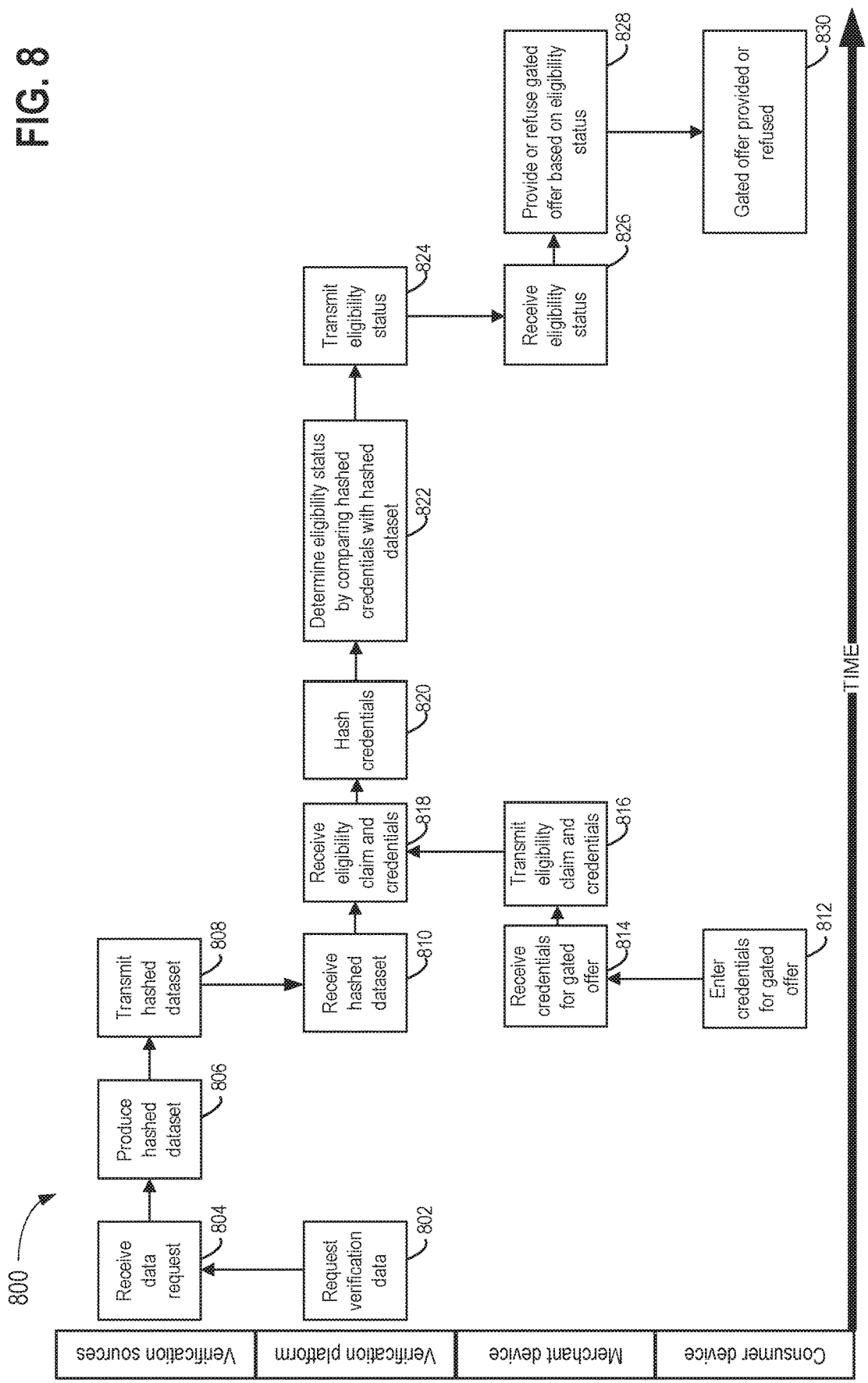

SYSTEMS AND METHODS FOR GATED OFFER ELIGIBILITY VERIFICATION

TECHNICAL FIELD

Embodiments of the subject matter disclosed herein relate to gated offer eligibility determination, and more particularly, to systems and methods for automatically determining gated offer eligibility of a consumer using a verification platform.

BACKGROUND AND SUMMARY

Gated offers may be provided by merchants to attract new customers, increase customer satisfaction, increase customer loyalty, or influence a consumer's spending behavior. In one example, merchants may use gated offers to attract a particular demographic of consumer by tailoring a gated offer specifically for the demographic. Gated offers are targeted, gated promotions designed for members of a particular group/demographic based on their occupation, life stage or affiliation, such as "college student" or "member of the military." One reason gated offers have been shown to increase customer satisfaction and brand loyalty are the positive feelings evoked in the consumer in response to receiving a truly exclusive offer. In order to maintain the exclusivity of gated offers, merchants may request consumers provide credentials in support of an assertion of eligibility prior to receiving access to a gated offer. In one example, in order to receive a senior citizen discount, a military discount, a student discount, etc. a consumer may first need to provide credentials, such as an ID, a student ID, a military ID, etc., in support of their assertion of eligibility to the gated offer.

In order to support verification of eligibility for online purchases, credentials provided by a consumer, in support of the consumer's claim of eligibility to a gated offer, may be referenced against one or more data sources. Therefore, a merchant, or third party verification service, may license data from various data providers to query when attempting to verify eligibility. As a matter of convenience and performance, the data provider may allow the merchant or verification service to host the licensed data, in order to facilitate searches/lookups in compliance with a data usage agreement.

However, the inventors herein have identified potential issues with the above approach. In one example, by allowing the merchant or verification service to hold the licensed data, the data provider may have reduced control over how the licensed data is used. In another example, there may be a greater probability of exposure of personal data when the data is hosted by a merchant or verification service. In another example, in the event of a user's data being exposed, a data provider may be unable to verify a source of the breach.

Therefore, it may be generally desirable to explore approaches for verifying consumer eligibility to gated offers while reducing data exposure, providing a degree of traceability for licensed data, and enabling a data provider a greater degree of control over usage of licensed data.

The current disclosure at least partially addresses the issues described above. In a first representation, a verification platform may verify a consumer's eligibility for a gated offer, using data provided by a verification source (also referred to herein as a data provider) while reducing a probability of data exposure, by executing a method comprising, receiving an eligibility claim from a requester, receiving credentials from a consumer, selecting a verification source based on the eligibility claim and the credentials, determining an eligibility status of the eligibility claim by comparing the credentials against a hashed dataset of the verification source, and transmitting the eligibility status to the requester.

The above summary is provided to introduce a selection of concepts in a simplified form that are further described below in the Detailed Description. This summary is not intended to identify key features or essential features of the subject matter, nor is it intended to be used to limit the scope of the subject matter. Furthermore, the subject matter is not limited to implementations that solve any or all of the disadvantages noted above or in any part of this disclosure.

BRIEF DESCRIPTION OF THE FIGURES

FIG. 7A shows a flowchart of an exemplary method for a verification platform to compare consumer credentials against verification data held by a verification source.

FIG. 7B shows a flowchart of an exemplary method for a verification source to generate a hashed dataset and perform a comparison of hashed customer data with the hashed dataset, in response to a comparison request from a verification platform.

FIG. 8 shows an exemplary communication timeline between a consumer device, a merchant device, a verification platform, and a verification source.

DETAILED DESCRIPTION

Systems and methods are disclosed herein for automatically determining an eligibility status of an eligibility claim of a consumer. An eligibility claim may be generated by a merchant in response to a consumer attempting to gain access to a gated offer provided by the merchant. The consumer may submit one or more credentials supporting the asserted eligibility for the gated offer, and the credentials may be transmitted to a verification platform along with the eligibility claim. The verification platform may then compare the submitted credentials against one or more verification sources in order to determine an eligibility status for the consumer. The systems and methods disclosed herein may enable automatic, flexible, and accurate, verification of a consumer's asserted eligibility to a gated offer. Further, the current disclosure comprises systems and methods for hashing credentials provided by the consumer, and determining an eligibility status of the consumer by comparing the hashed credentials with a hashed dataset, wherein both the hashed credentials and hashed dataset are produced using the same seed hash. As hashing comprises a one way mapping, once data is hashed, it is computationally unfeasible to re-derive the input (un-hashed) data from the hashed data. Therefore, exchange of hashed data, instead of un-hashed data, obfuscates underlying personal details and affiliations, and is substantially more secure than exchange of un-hashed data. In this way, a consumer's eligibility for a gated offer may be determined, while using a hashed form of consumer data (hashed credentials), wherein the hashed consumer data obscures the underlying personal data of the consumer, reducing a probability of consumer data exposure. Further, the seed hash used to produce the hashed credentials and the hashed dataset may be produced from a data specification including one or more details of a licensing agreement between the verification platform and the verification source, agreed upon by the verification platform and the verification source. Thus, the hashed credentials and hashed dataset may be traced back to the licensing agreement between the verification platform and the verification source in the case of a data breach.

Figure 1:
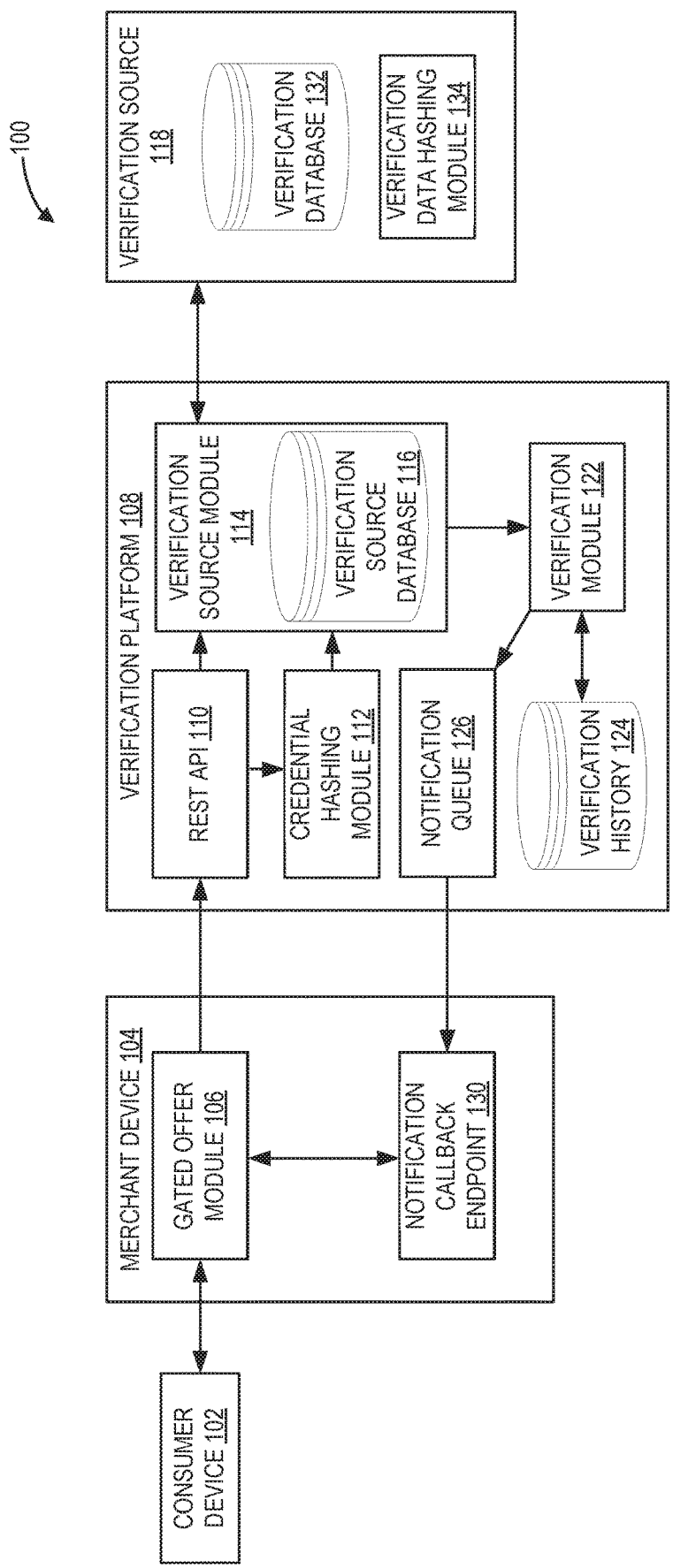
FIG. 1 shows an example of a gated offer eligibility verification system comprising a verification platform.
Figure 2:
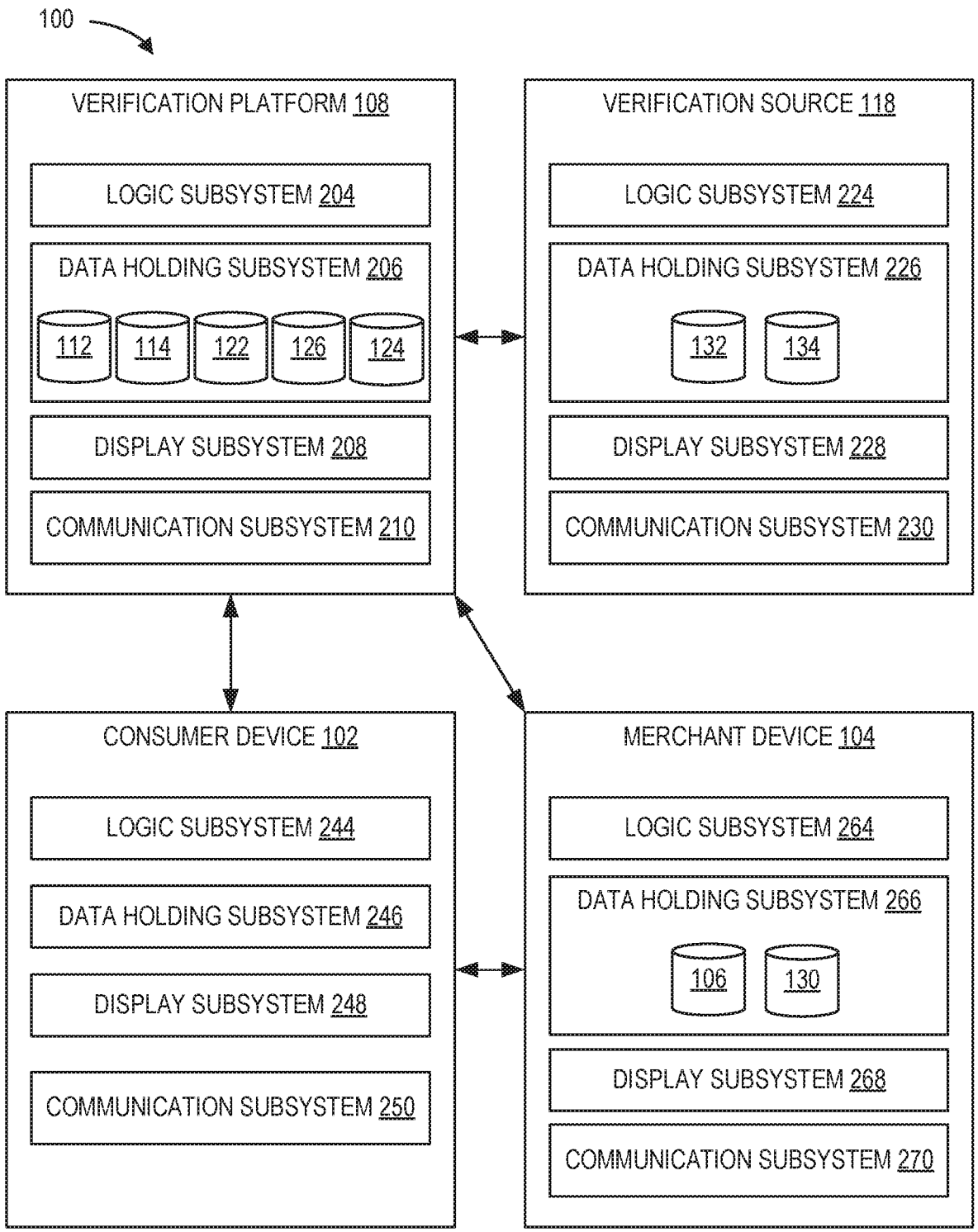
FIG. 2 shows another example of a gated offer eligibility verification system comprising a verification platform.

In one example, the current disclosure provides for an eligibility claim verification system 100, shown in FIG. 1, including data verification platform 108, which may receive eligibility claims generated by merchant device 104, in response to requests from consumer device 102 for access to a gated offer provided by a merchant associated with merchant device 104. FIG. 2 shows an alternate view of eligibility claim verification system 100, emphasizing the hardware components of the system 100.

Figure 3A:
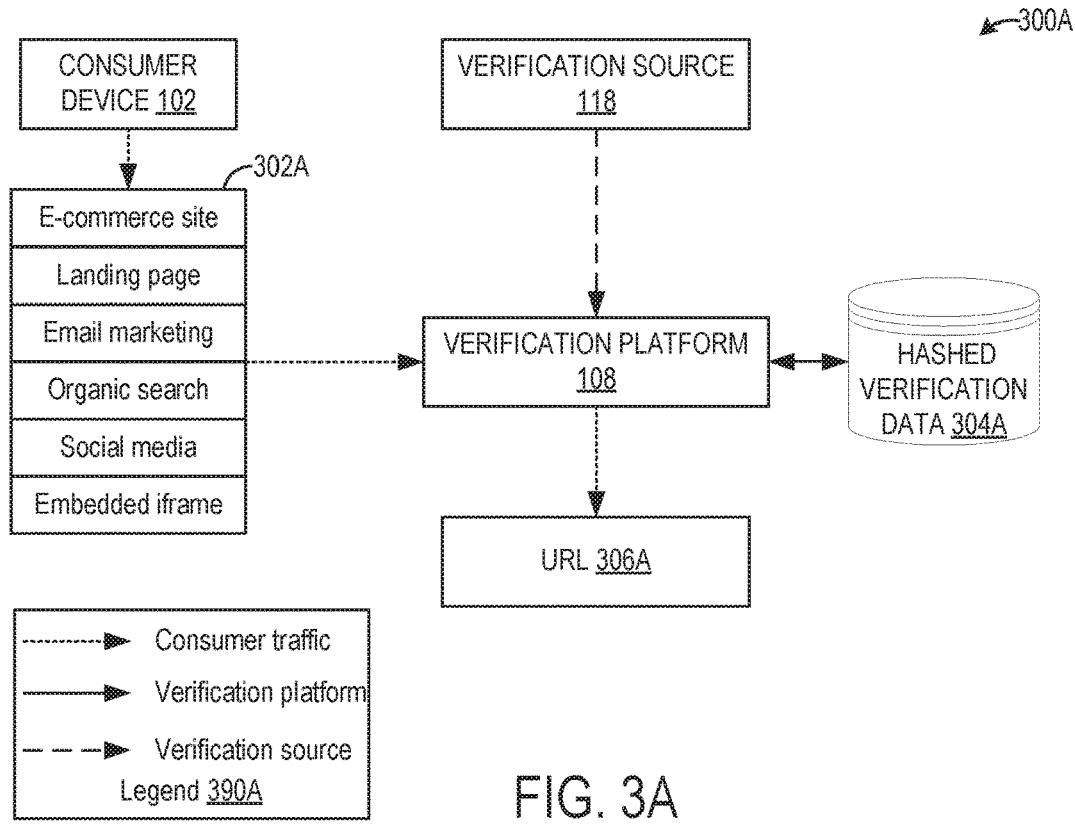
FIG. 3A shows a first example of a consumer traffic flowchart.
Figure 3B:
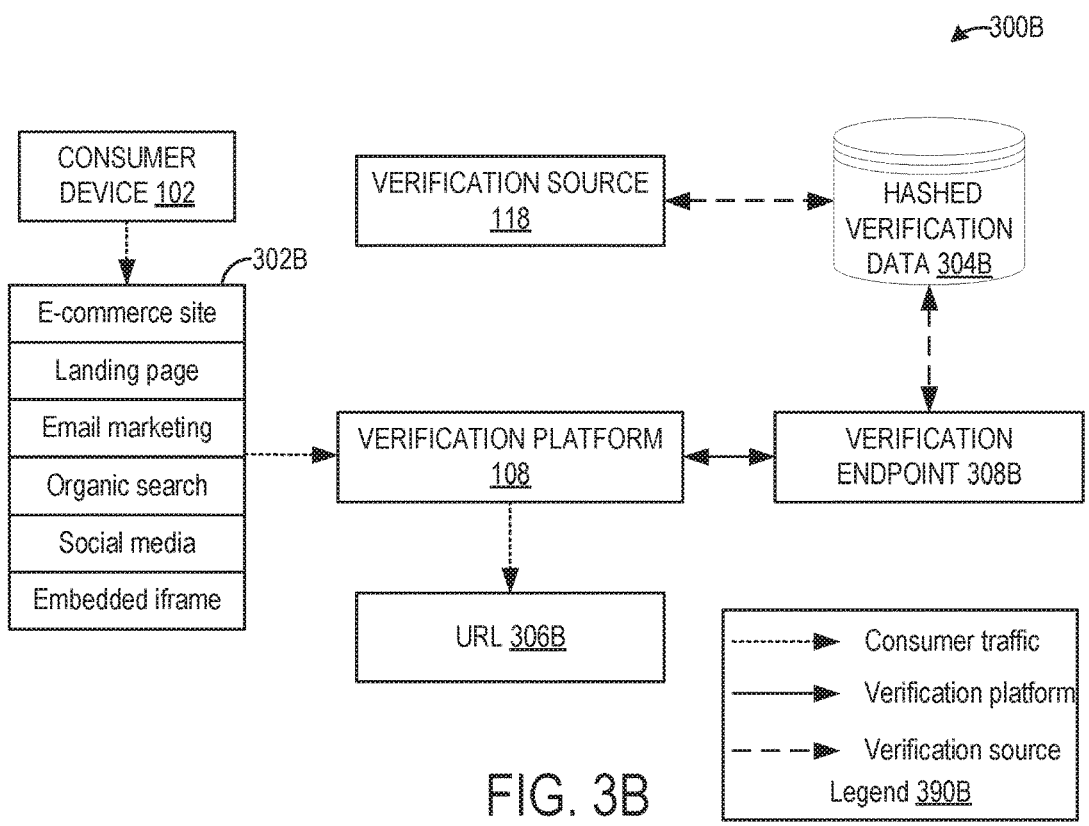
FIG. 3B shows a second example of a consumer traffic flowchart.

FIGS. 3A and 3B illustrate a first and second embodiment, respectively, of consumer traffic during an eligibility status verification process. FIGS. 3A and 3B show how a consumer, via a consumer device 102, may be directed to verification platform 108 through a plurality of channels (302A and 302B) to obtain access to a gated offer. The user may submit credentials to the verification platform, to evidence eligibility for the gated offer, and the verification platform 108 may then determine an eligibility status based on the credentials, and may, in some examples, direct the consumer to a pre-determined URL (such as URL 306A and/or 306B) based on the eligibility status.

Figure 4:
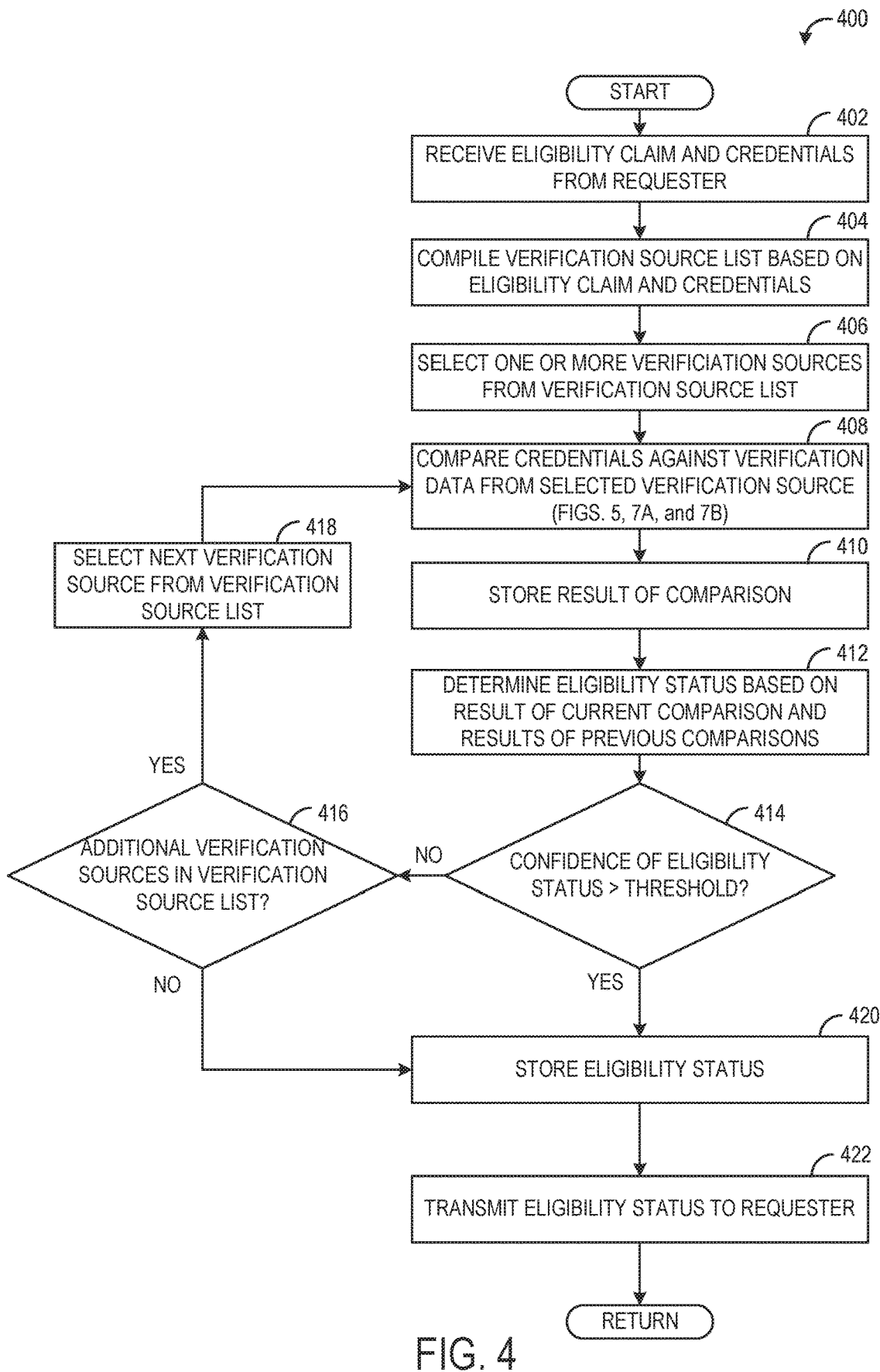
FIG. 4 shows a flowchart of an exemplary method for determining an eligibility status of an eligibility claim using a verification platform.

The verification platform 108 may receive an eligibility claim from the merchant device 104 and supporting credentials from the consumer device 102, and may execute a method, such as method 400 shown in FIG. 4, to intelligently select one or more verification sources based on the eligibility claim and the credentials. Method 400 further includes determining an eligibility status for the eligibility claim by comparing the credentials against verification data from the one or more selected verification sources (as used herein, a verification source is also referred to as a verification data provider, or simply a data provider). By selecting one or more verification sources based on a received eligibility claim, and credentials provided in support of the eligibility claim, the verification platform may enable handling of numerous types of consumer provided credentials, and may more rapidly determine a verification status by selecting verification sources based on one or more criteria, such as the likelihood of the source to conclusively determine the eligibility status, the types of data included within a verification source, etc.

In one illustrative example, a verification platform may receive an eligibility claim comprising a consumer request to obtain access to a gated offer provided to teachers, and credentials in support of the eligibility claim, wherein the credentials comprise a first name, last name, a school name, and ID number. In response, the verification platform may determine which of the available verification sources are capable of corroborating the eligibility claim based on the provided credentials. For example, the verification platform may access a public directory of the school indicated in the credentials, and may compare the first name, last name, and ID number provided with the eligibility claim against the entries in the public directory. The verification platform may determine the eligibility claim is valid (that is, may determine the eligibility status of the eligibility claim is valid) in response to the first name, last name, and ID number of the credentials matching with an entry in the public directory.

Figure 5:
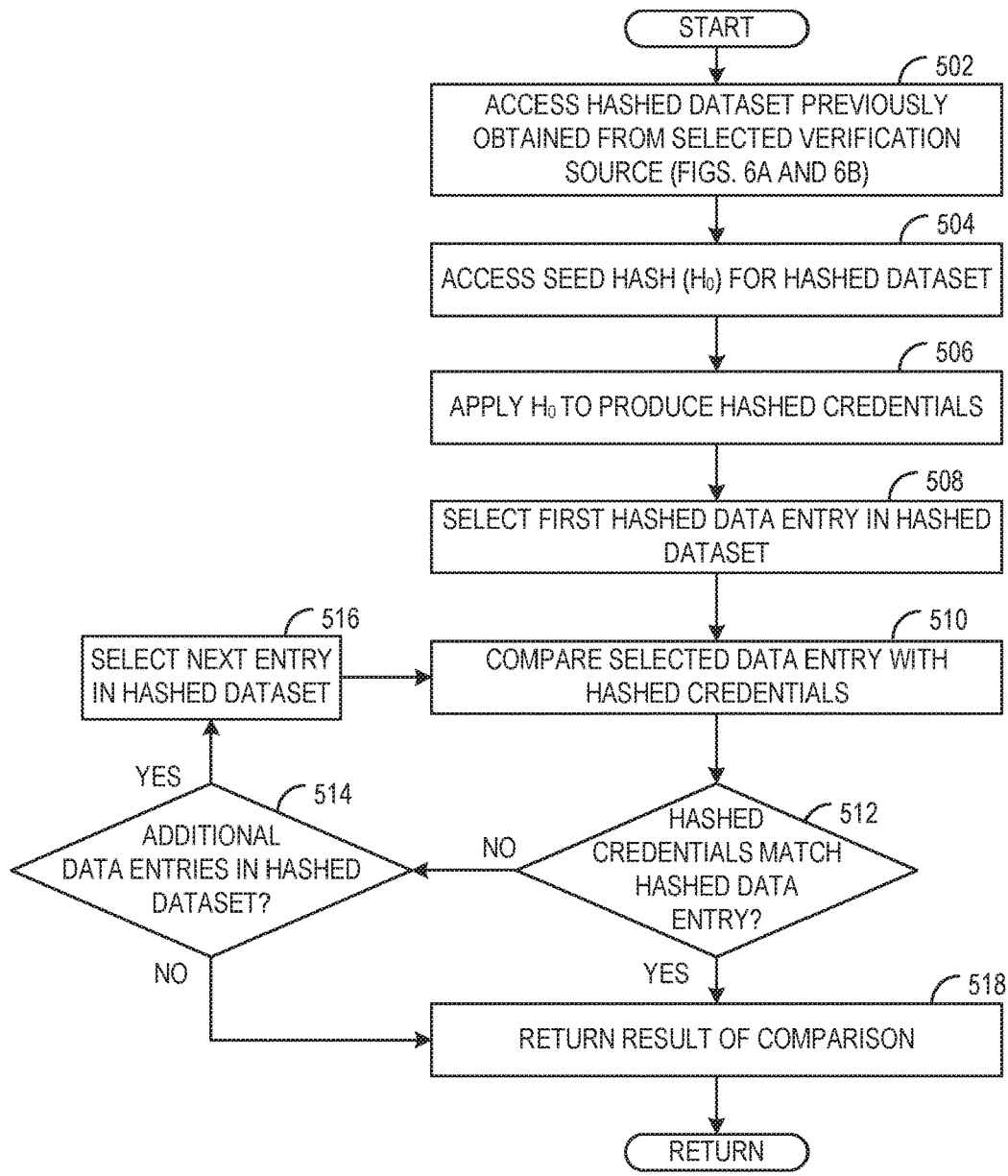
FIG. 5 shows a flowchart of an exemplary method for a verification platform to compare consumer credentials against a hashed dataset previously acquired from a verification source.

FIG. 5 shows a first embodiment of a method 500 for comparing consumer credentials against verification data from a selected verification source. Method 500 may be executed as part of method 400. Method 500 comprises hashing credentials using a seed hash to obtain hashed credentials, and comparing the hashed credentials against a hashed dataset, previously obtained by the verification platform from the selected verification source. The verification platform may acquire the hashed dataset during the onboarding process of the selected verification source, according to one or more of the steps of methods 600A and 600B, shown in FIGS. 6A, and 6B, respectively. Hashing is a one way (substantially irreversible), repeatable, mapping of an input string to an output string (wherein the output string is referred to as a hash), and therefore provides a way to compare data in an obfuscated form. As it is computationally impractical to derive the input string from the output hash alone, hashing provides a secure means by which a verification source and verification platform may compare consumer credentials with verification data. By providing the verification platform with verification data in the form of a hashed dataset, the verification source reduces the exposure of the underlying personal data it holds, while simultaneously enabling the verification platform to query the hashed dataset with reduced latency, which may in turn enable more rapid determination of an eligibility status.

Method 600B further provides a degree of traceability to the verification data provided by the verification source to the verification platform, as the seed hash used to generated the hashed dataset may be produced by serializing and hashing a data use agreement/data licensing agreement, between the verification platform and verification source. In one example, if a data breach occurs, or if a data licensee breaks the terms of a data licensing agreement by sharing data with an unauthorized party, the verification source may determine from which data licensing agreement the data breach originated. In one example, in response to receiving a hashed data entry, wherein the hashed data entry is identified as a leaked data entry (e.g., if the hashed data entry is found on a website with which the verification source does not have a data licensing agreement), a verification source may compare the hashed data entry against a plurality of hashed data entries from a plurality of hashed data sets. If the leaked data entry originated from one of the hashed data sets provided by the verification data source, the hashed data entry will match one of the hashed entries in one of the hashed data sets. In other words, the hashed data set in which the leaked data entry finds a match, is the dataset from which the leaked data originated. Further, as the hash seed used to produce the hashed data set is uniquely associated with a data specification indicating a data licensing agreement, the verification source may determine from which data licensing partner the data was leaked.

FIGS. 7A and 7B show methods 700A and 700B, respectively, which comprise a second embodiment of a method for comparing consumer credentials against verification data from a selected verification source, to determine an eligibility status for an eligibility claim. FIGS. 7A and 7B may be executed as part of method 400. Specifically, method 700A includes the verification platform hashing consumer credentials using a seed hash, and transmitting the hashed credentials to the selected verification source. In this way, the verification platform does not expose the identity of the consumer, as the consumer credentials are hashed prior to transmission to the verification source. The selected verification source may then generate a hashed dataset using the same seed hash, and compare the received hashed credentials against a plurality of hashed data entries of the hashed dataset, according to one or more of the steps of method 700B, shown in FIG. 7B. The verification source may then return the result of the comparison to the verification platform, and the verification platform may determine the eligibility status based on the returned comparison result. In this way, the verification platform may export consumer credentials for comparison by an external verification source, without exposing the underlying personal information of the consumer.

FIG. 8 shows an example timeline of communication between a consumer device, a merchant device, a verification platform, and a verification source, such as may occur during execution of a method for determining an eligibility status of a consumer. FIG. 8 highlights the various data transmission which may occur between the consumer device, merchant device, verification platform, and verification sources, during execution of one embodiment of a method for determining an eligibility status.

Turning first to FIG. 1, a high level block diagram of an eligibility claim verification system 100 is shown. Eligibility claim verification system 100 may be configured to execute one or more of the steps of one or more of the methods herein disclosed, and enables rapid, automatic, flexible, and accurate verification of consumer eligibility claims, while reducing data exposure. Eligibility claim verification system 100 comprises consumer device 102, merchant device 104, verification platform 108, and verification source 118. Although a single consumer device 102, a single merchant device 104, and a single verification source 118, are shown in FIG. 1, this is done for simplicity, and it will be appreciated that the current disclosure provides for a plurality of consumer devices, a plurality of merchant devices, and a plurality of verification sources. In one example, verification platform 108 may be communicably coupled to a plurality of verification sources, a plurality of merchant devices, and a plurality of consumer devices.

Consumer device 102 may exchange data with merchant device 104. In one example, consumer device 102 is communicably coupled to merchant device 104 via a network connection, such as the Internet. Consumer device 102 may comprise a smartphone, a laptop, a desktop computer, a smart TV, a virtual assistant, etc. In one example, a consumer may utilize consumer device 102 to access a merchant website hosted by merchant device 104. The consumer device 102 may enable a consumer to enter data, and transmit said data to merchant device 104. In one example, merchant device 104 may transmit a gated offer solicitation to a consumer via the consumer device, and the consumer may attempt to redeem/access the gated offer by selecting the gated offer solicitation, and entering one or more credentials which may be used to support/verify the consumer's eligibility for the offer. In one example, the credentials may be transmitted to the merchant device 104, and received by gated offer module 106. In another example, the credentials may be transmitted directly from the consumer device 102 to the verification platform 108. In some examples, gated offer module 106 may re-direct consumer device 102 to verification platform 108, and a consumer may input credentials via consumer device 102 directly to the verification platform. In one example, gated offer module 106 may re-direct a web browser of consumer device 102 to verification platform 108, where the consumer may be prompted to input one or more credentials in support of a claim of eligibility to a gated offer. In some examples, in response to a consumer selecting a gated offer solicitation using consumer device 102, the consumer device may be re-directed to (put in communication with) verification platform 108, and verification platform 108 may receive an eligibility claim and credentials directly from the consumer device 102.

Merchant device 104 may exchange data with consumer device 102, and verification platform 108. Merchant device 104 may comprise a server, hosting a merchant website, and configured to communicate with a plurality of consumer devices and/or other devices via a wireless or wired connection. Merchant device 104 comprises gated offer module 106, which may include machine executable instructions for operating one or more gated offer campaigns. In one example, gated offer module 106 may comprise instructions that when executed cause merchant device 104 to transmit a gated offer solicitation to consumer device 102, which may be displayed to the consumer in a graphical user interface of a display device of the consumer device. In one example, gated offer module 106 may transmit a gated offer solicitation to consumer device 102 during a check-out process. In some examples, gated offer module 106 may receive credentials from consumer device 102, in support of a consumer's request to access/redeem a gated offer. Gated offer module 106 may be configured to generate an eligibility claim responsive to a consumer's attempt to gain access to a gated offer, wherein the eligibility claim indicates a status, occupation, age, demographic, or other information/attribute of the consumer. In one example, an eligibility claim may indicate a claimed affiliation of the consumer, along with the type of credentials which may be used in support of the claim, such as, (CLAIM:Student; ORGANIZATION:OSU; FIRST_NAME, LAST_NAME, SID), wherein, in the above example, the claimed affiliation is student of OSU, and the credentials in support of this claim are the first name, last name, and student ID number of the consumer.

Gated offer module 106 may further be configured to receive an eligibility status from notification callback endpoint 130. In response to an eligibility status received from notification callback endpoint 130 gated offer module may either provide, or refuse, the gated offer to the consumer. In one example, gated offer module 106 may re-direct consumer device 102 to a first URL in response to an eligibility status indicating the consumer is eligible to receive a gated offer, or gated offer module 106 may re-direct consumer device 102 to a second URL, distinct from the first URL, in response to the eligibility status indicating the consumer is not eligible to receive the gated offer. In some embodiments, the verification platform may re-direct the consumer device to either a first pre-determined URL, or a second pre-determined URL based on the eligibility status.

In one example, after determining an eligibility status for an eligibility claim, the verification platform 108 may transmit the determined eligibility status to the notification callback endpoint 130 of the merchant device 104, wherein the merchant device 104 generated the eligibility claim corresponding to the determined eligibility status. In one example, notification callback endpoint may comprise a URL of a rest endpoint for merchant device 104. In some example, determined eligibility statuses may be queued at notification callback endpoint 130, and processed by gated offer module 106 in a first-in-first-out scheme.

Gated offer module 106 may be configured to transmit eligibility claims to the verification platform 108. In the example shown in FIG. 1, gated offer module 106 may transmit eligibility claims, and corresponding credentials, to rest verification platform 108 using REST API 110.

Once received at REST API 110, eligibility claims may be queued, prior to being processed by verification source module 114. In some embodiments, credentials received at REST API 110 may be transmitted to credential hashing module 112, wherein credential hashing module 112 may be configured to hash received credentials using one or more hashing algorithms. In one example, credential hashing module 112 includes machine executable instructions for computing hashes using an SHA-256 algorithm. In another example credential hashing module 112 may be configured with machine executable instructions for computing a HMAC-SHA256 value using a seed hash as the key. Credential hashing module 112 may further be configured to compute a seed hash from a data specification. Hashes determined by credential hashing module 112 may be transmitted to verification source module 114 to support eligibility status determination.

Verification source module 114 includes verification source database 116. The verification source database 116 includes information pertaining to a plurality of verification sources, such as verification source 118. In one example, verification source database includes a plurality of data specifications, corresponding to a plurality of verification sources, wherein the data specifications comprise a data licensing agreement between a verification source and the verification platform. The data specifications stored in verification source database 116 may further include one or more pieces of data pertaining to the format/structure of data stored at a corresponding verification source. In one example, a data specification may include one or more types of data fields included in a verification source. Verification source database 116 may further include an indication of a speed, accuracy, coverage, etc. of one or more verification sources, which may be used by verification source module 114 to determine a priority ranking for each verification source for a particular eligibility claim. In some embodiments, verification source database 116 comprises a plurality of web addresses corresponding to the verification sources. Verification source module 114.

Verification source module 114 may include instructions for intelligently selecting one or more verification sources in response to an eligibility request received from REST API 110, such as discussed in more detail below with reference to FIG. 4. In one example, verification source module 114 may filter verification sources included in verification source database 116 based on a received eligibility claim, and further based on one or more received credentials in support of the eligibility claim. Verification source module 114 may further include instructions for interfacing with the plurality of verification sources included in verification source database 116. In one example, verification source module 114 may include instructions for requesting verification data from one or more verification sources. In another example, verification source module 114 may include instructions for acquiring verification data from one or more verification sources. In one example, verification source module 114 may scrape data from a webpage, or other publically accessible directory/database. Verification data obtained by verification source module 114 may be transmitted to verification module 122.

Verification module 122 is configured to compare credentials provided in support of an eligibility claim, with verification data obtained by verification source module 114, and determine an eligibility status based thereon. Verification module 122 may comprise one or more verification models, and based on a received eligibility claim, may select a verification model to use in determination of an eligibility status for the eligibility claim. In one example, verification module 122 may comprise instructions for executing an optimistic model, wherein, an optimistic model may respond to credentials matching a single data entry in a verification data by determining the eligibility status of an eligibility claim is valid (or true). In another example, the verification module 122 may include instructions for executing a scoring model, wherein, for each match between a customer credential and a verification data entry, a score may be determined (and added to any previous scores for the current eligibility claim). The scoring model may include a cumulative score threshold, wherein, upon a cumulative score determined for an eligibility claim exceeding the cumulative score threshold, the verification module 122 may set an eligibility status for the eligibility claim to a pre-defined number indicating the eligibility claim is valid, or conversely, if the cumulative score is below the cumulative score threshold, the verification module 122 may set the eligibility status to a pre-determined value indicating the eligibility claim is invalid.

In one example, an eligibility status comprises a Boolean, wherein an eligibility status is valid if the value of the Boolean is 1 and the eligibility status is invalid if the Boolean is 0. In other examples, the eligibility status may comprise one or more pre-defined numbers corresponding to one or more pre-defined eligibility determinations, such as valid, invalid, undetermined, etc. The verification module 122 may, in one example, determine a number of matches between customer credentials, and verification data obtained from one or more verification sources. In another example, the verification module 122. In some examples, responsive to the number of matches exceeding a pre-determined threshold, the verification module may set the eligibility status of the eligibility claim to a predetermined value indicating the eligibility claim is valid.

Following determination of an eligibility status for an eligibility claim, the verification module 122 may save a result of the verification (the eligibility status), and one or more additional details pertaining to the eligibility claim, in verification history 124. Data stored in verification history 124 may be used to audit the performance of the verification platform 108. In one example, one or more merchants partnered with the verification platform may periodically review the data within verification history 124.

Verification module 122 may also transmit the determined eligibility status to notification queue 126. Notification queue 126 may comprise a queue of eligibility statuses awaiting transmission to one or more notification callback endpoints of one or more merchants. In one example, notification queue 126 may comprise a last-in-last-out queue. In some embodiments, following determination of the eligibility status, notification queue 126 may communicate directly with a consumer device, such as consumer device 102, to re-direct the consumer device 102 to a pre-determined URL in response to the eligibility status.

Verification source 118 is communicably coupled to verification platform 108. Verification platform 118 may include one or more databases, such as verification database 132, and verification data hashing module 134. Verification database 132 may comprise a plurality of data entries. In one example, verification database 132 comprises a lightweight directory access protocol (LDAP) directory. Verification source 118 may be configured to anonymize/un-identify data from verification database 132, prior to transmission of said data to verification platform 108. In one example, verification source 118 may be configured to execute one or more steps of method 500, to produce a hashed data set, in response to a verification data request.

Turning now to FIG. 2, an alternate view of gated offer eligibility verification system 100 is shown. Components of the gated offer eligibility verification system 100 already described in FIG. 1, may not be described again in detail in the description of FIG. 2. Specifically, FIG. 2 emphasizes the hardware components of the consumer device 102, the merchant device 104, the verification platform 108, and the verification source 118. However, not all of the components illustrated may be required to practice the invention. Variations in the arrangement and type of the components may be made without departing from the spirit or scope of the invention.

Verification platform 108 may, in some embodiments, comprise a server, or a plurality of servers, configured to verify or invalidate a plurality of eligibility claims produced by a plurality of communicably connected devices. In different embodiments, verification platform 108 may take the form of a mainframe computer, server computer, desktop computer, laptop computer, tablet computer, home entertainment computer, network computing device, mobile computing device, mobile communication device, gaming device, etc.

Verification platform 108 may include a logic subsystem 204, and a data-holding subsystem 206. Verification platform 108 may optionally include a display subsystem 208, communication subsystem 210, and/or other components not shown in FIG. 2. For example, verification platform 108 may also optionally include user input devices such as keyboards, mice, game controllers, cameras, microphones, and/or touch screens.

Logic subsystem 204 may include one or more physical devices configured to execute one or more instructions. For example, logic subsystem 204 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 204 may include one or more processors that are configured to execute software instructions. Additionally or alternatively, the logic subsystem 204 may include one or more hardware or firmware logic machines configured to execute hardware or firmware instructions. Processors of the logic subsystem 204 may be single or multi-core, and the programs executed thereon may be configured for parallel or distributed processing. The logic subsystem 204 may optionally include individual components that are distributed throughout two or more devices, which may be remotely located and/or configured for coordinated processing. For example, the logic subsystem 204 may include several engines for processing and analyzing data. One or more aspects of the logic subsystem 204 may be virtualized and executed by remotely accessible networked computing devices configured in a cloud computing configuration.

Data-holding subsystem 206 may include one or more physical, non-transitory devices configured to hold data and/or instructions executable by the logic subsystem 204 to implement the herein described methods and processes. When such methods and processes are implemented, the state of data-holding subsystem 206 may be transformed (for example, to hold different data). For example, the data-holding subsystem may comprise the verification source database 116, the verification history 124, instructions for implementing verification module 122, instructions for implementing credential hashing module 112, and instructions for implementing verification module 114.

Data-holding subsystem 206 may include removable media and/or built-in devices. Data-holding subsystem 206 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 206 may include devices with one or more of the following characteristics: volatile, nonvolatile, dynamic, static, read/write, read-only, random access, sequential access, location addressable, file addressable, and content addressable. In some embodiments, logic subsystem 204 and data-holding subsystem 206 may be integrated into one or more common devices, such as an application-specific integrated circuit or a system on a chip.

It is to be appreciated that data-holding subsystem 204 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 208 may be used to present a visual representation of data held by data-holding subsystem 206. As the herein described methods and processes change the data held by the data-holding subsystem 206, and thus transform the state of the data-holding subsystem 206, the state of display subsystem 208 may likewise be transformed to visually represent changes in the underlying data. Display subsystem 208 may include one or more display devices utilizing virtually any type of technology. Such display devices may be combined with logic subsystem 204 and/or data-holding subsystem 206 in a shared enclosure, or such display devices may be peripheral display devices.

When included, communication subsystem 210 may be configured to communicatively couple verification platform 108 with one or more other computing devices, such as consumer device 102, merchant device 104, and verification source 118. Communication subsystem 210 may include wired and/or wireless communication devices compatible with one or more different communication protocols. As non-limiting examples, communication subsystem 210 may be configured for communication via a wireless telephone network, a wireless local area network, a wired local area network, a wireless wide area network, a wired wide area network, etc. In some embodiments, communication subsystem 210 may allow verification platform 108 to send and/or receive messages to and/or from other devices via a network such as the public Internet.

Consumer device 102, merchant device 104, and verification source 118 may include various hardware for storing software instructions, processing data and user input, and executing the software instructions responsive to said user inputs. In particular, consumer device 102, merchant device 104, and verification source 118 may include logic subsystems, and data-holding subsystems. As such, they may collectively be described herein for the sake of brevity.

Consumer device 102, merchant device 104, and verification source 118 may include logic subsystems 244, 264, and 224, respectively, and data-holding subsystems 246, 266, and 226, respectively. Consumer device 102, merchant device 104, and verification source 118 may optionally include display subsystems 248, 268, and 228, respectively and/or communication subsystems 250, 270, and 230, respectively, and/or other components not shown in FIG. 2. For example, consumer device 102, merchant device 104, and verification source may also optionally include user input devices such as keyboards, mice, game controllers, cameras, microphones, and/or touch screens.

Logic subsystems 244, 264, and 224 may include one or more physical devices configured to execute one or more instructions. For example, logic subsystems 244, 264, and 224 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystems 244, 264, and 224 may include one or more processors that are configured to execute software instructions. Additionally or alternatively, the logic subsystems 244, 264, and 224 may include one or more hardware or firmware logic machines configured to execute hardware or firmware instructions. Processors of the logic subsystems 244, 264, and 224 may be single or multi-core, and the programs executed thereon may be configured for parallel or distributed processing. The logic subsystems 244, 264, and 224 may optionally include individual components that are distributed throughout two or more devices, which may be remotely located and/or configured for coordinated processing. One or more aspects of the logic subsystems 244, 264, and 224 may be virtualized and executed by remotely accessible networking computing devices configured in a cloud computing configuration.

Data-holding subsystems 246, 266, and 226 may include one or more physical, non-transitory devices configured to hold data and/or instructions executable by the logic subsystems 244, 224, and 264 to implement the herein described methods and processes. When such methods and processes are implemented, the state of data-holding subsystems 246, 266, and 226 may be transformed (for example, to hold different data). As such, data-holding subsystem 266 may include gated offer module 106 and callback notification endpoint 130, and data holding subsystem 226 may include verification data hashing module 134 and verification database 132.

Data-holding subsystems 246, 266, and 226 may include removable media and/or built-in devices. Data-holding subsystems 246, 266, and 226 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystems 246, 266, and 226 may include devices with one or more of the following characteristics: volatile, nonvolatile, dynamic, static, read/write, read-only, random access, sequential access, location addressable, file addressable, and content addressable. In some embodiments, logic subsystems 244, 264, and 224 and data-holding subsystems 246, 266, and 226 may be integrated into one or more common devices, such as an application-specific integrated circuit or a system on a chip.

When included, display subsystems 248, 268, and 228 may be used to present a visual representation of data held by data-holding subsystems 246, 266, and 226. As the herein described methods and processes change the data held by the data-holding subsystems 246, 266, and 226, and thus transform the state of the data-holding subsystems 246, 266, and 226 the state of display subsystems 248, 268, and 228 may likewise be transformed to visually represent changes in the underlying data. Display subsystems 248, 268, and 228 may include one or more display devices utilizing virtually any type of technology. Such display devices may be combined with logic subsystems 244, 264, and 224 and/or data-holding subsystems 246, 264, and 226 in a shared enclosure, or such display devices may be peripheral display devices.

When included, communication subsystems 250, 270, and 230 may be configured to communicatively couple the consumer device 102, merchant device 104, and verification source 118, with one or more the other computing devices. Communication subsystems 250, 270, and 230 may include wired and/or wireless communication devices compatible with one or more different communication protocols. As non-limiting examples, communication subsystems 250, 270, and 230 may be configured for communication via a wireless telephone network, a wireless local area network, a wired local area network, a wireless wide area network, a wired wide area network, etc. In some embodiments, communication subsystems 250, 270, and 230 may allow the consumer device 102, merchant device 104, and verification source 118 to send and/or receive messages to and/or from the other devices, as well as server 104 via network 101 such as the public Internet.

Turning to FIG. 3A, a flowchart 300A illustrating a first embodiment of consumer traffic during an eligibility status verification process is shown. Elements previously introduced and described in FIGS. 1-2 may retain their numbering in FIG. 3A, and may therefore be discussed only briefly. FIG. 3A includes legend 390A, wherein arrows with dotted tails are shown to indicate consumer traffic (e.g., traffic of a consumer associated with consumer device 102), arrows with solid tails are shown to indicate actions of the verification platform 108, and arrows with dashed tails are shown to indicate actions/data transmission of the verification source 118. FIG. 3A emphasizes data transmission between the consumer device 102, verification platform 108, and verification source 118, which may occur during determination of an eligibility status of a consumer, such as during execution of method 400 shown in FIG. 4 below.

Starting at verification source 118, verification data may be transmitted to the verification platform 108, as indicated by the dash tailed arrow connecting verification source 118 with verification platform 108. In one example, verification data may be transmitted to the verification platform 108 by verification source 118 in response to a data request generated by the verification platform 108, according to one or more steps of methods 600A and 600B, discussed in detail below. Verification source 118 and verification platform 108 may have an active data licensing agreement, specifying one or more terms of use, licensing periods, revenue share details, etc. agreed upon by verification platform 108 in exchange for access to verification data of verification source 118. In one example, revenue share details include one or more terms of a revenue sharing agreement between the verification platform 108 and verification source 118, wherein verification platform 108 may share a portion of its revenue with verification source 118 in exchange for verification source 118 providing verification data to verification platform 108, wherein the portion may be indicated by the revenue share details included in a data licensing agreement.

Verification source 118 may transmit verification data to verification platform 108, and verification platform 108 may then host the verification data to facilitate later eligibility status determinations. In one example, verification source 118 transmits a data specification associated with the verification data to verification platform 108, wherein the data specification includes one or more terms of use for the licensed verification data, one or more pieces of data pertaining to the data licensing agreement between the verification platform 108 and the verification source, a timestamp, a nonce value, and a cryptographic signature of the verification source. In one example, the verification data transmitted to the verification platform 108 by the verification source 118 comprises a hashed dataset, and the data specification includes an indication of a hashing algorithm used to generate the hashed dataset, a canonical format into which the data was placed prior to hashing, and one or more attributes of the hashed data entries included in the hashed dataset. In the embodiment shown by FIG. 3A, verification source 118 provides verification platform 108 with a hashed dataset, which verification platform 108 stores in hashed verification data 304A.

In one example, verification source 118 may generate a hashed dataset in response to a data request produced by verification platform 108 by executing one or more steps of method 600B, discussed in more detail below, with reference to FIG. 6B. In another example, the verification source 118 may transmit un-hashed verification data to verification platform 108, and the verification platform 108 may hash the verification data, store the verification data in hashed verification data 304A, and permanently discard the personally identifying details of the un-hashed verification data. In one example, verification source 118 may transmit verification data to verification platform 108 periodically, following a pre-determined period of time. In some examples, verification source 118 may transmit verification data to verification platform 108 responsive to a change/update in the verification data. In one example, a change/update in verification data may be initiated in response to a member of an institution hosting the verification source, ceasing affiliation with the institution, e.g., a roster of current students may be updated/changed in response to one or more students graduating, and thereby changing their affiliation with the school.

Consumer device 102 may access one or more of a plurality of channels 302A, as indicated by the dot tailed arrow connecting consumer device 102 with plurality of channels 302A. Plurality of channels 302A may comprise an e-commerce site, a landing page, an email, a search engine result, a social media web site, and an embedded iframe. Each of the plurality of channels 302A may indicate a gated offer, and may re-direct the consumer to a communication endpoint of verification platform 108 to verify the consumer's eligibility for the gated offer, as indicated by the dot tailed arrow connecting plurality of channels 302A with verification platform 108. In one example, a link to the verification platform 108 may be provided along with a solicitation for a gated offer, wherein the link re-directs a browser of consumer device 102 to a communication endpoint of verification platform 108.

In an illustrative example, a consumer browsing the Internet using consumer device 102 may access an e-commerce site. The e-commerce site may provide a gated offer, and the consumer may attempt to gain access to the gated offer by clicking on a link within the e-commerce site. For example, during a checkout process on an e-commerce site, a consumer may be prompted to enter one or more credentials in order to gain access to a gated offer, wherein the gated offer may comprise a discounted price/rate for one or more items or services to be purchased. In some examples, an e-commerce site, or other website, may employ an embedded iframe to the verification platform, wherein the embedded iframe may enable a user to directly input and transmit credentials to the verification platform while remaining on a webpage of the e-commerce site (or other site). In another example, a gated offer/gated content may be solicited on a social media platform/website, and in response to the consumer indicating interest in the gated offer/content the social media platform/website may re-direct a web browser of consumer device 102 to verification platform 108. In another example, a gated offer may be offered to a consumer by a merchant through email marketing, wherein an email produced by a merchant may include a solicitation for a gated offer provided by the merchant, and the email may further include a link to the verification platform 108, where the consumer may be prompted to enter one or more credentials in support of the assertion of eligibility to the gated offer.

Following re-direction of a web browser of consumer device 102 to verification platform 108, a consumer may be prompted to input one or more credentials to validate the consumer's eligibility for the gated offer. As gated offers comprise exclusive offers provided to a specific demographic, consumer credentials may comprise one or more pieces of personal data pertaining to the consumer which may evidence a consumer's claim to belong to a demographic specified by the gated offer. In one example, a consumer credential may comprise one or more of a name, a social security number, a birth date, an ID number, an email address, an address, a phone number, or other types of personal data. In one example, the consumer may submit the credentials directly to the verification platform via a 2048-bit Secure Sockets Layer (SSL) encrypted HTTPS. In some examples, consumer credentials may be hashed prior to submission to verification platform 108.

The submitted consumer credentials, along with an indication of an asserted eligibility/demographic-affiliation of the consumer, may be packaged into an eligibility claim, or otherwise associated with an eligibility claim. In one example, an eligibility claim for a consumer asserting student status may comprise an indication of the asserted demographic affiliation (student), with the one or more types of credentials capable of evidencing the asserted demographic affiliation (e.g., name, birthdate, student ID, school email address etc.). In some examples, a merchant device may generate an eligibility claim. In some examples, the verification platform 108 may generate the eligibility claim after receiving credentials directly from consumer device 102.

Following submission of consumer credentials to verification platform 108, the verification platform 108 may attempt to determine a verification status based on the credentials. In one example, a verification status may comprise a true/false determination of the validity of a claim of eligibility made by a consumer for a gated offer. In some examples, the consumer may submit credentials to a merchant, such as an e-commerce site, and the e-commerce site may generate an eligibility claim based on the credentials, and may transmit the eligibility claim and credentials to the verification platform. In another example, a merchant may generate an eligibility claim in response to a consumer attempting to gain access to a gated offer, and a consumer may submit credentials in support of the eligibility claim to the verification platform 108.

In one example, verification platform 108 may determine an eligibility status using one or more of the steps of methods 400, and 500, discussed in more detail below. In the embodiment shown by FIG. 3A, verification platform 108 hashes the received consumer credentials to produce hashed credentials, using a seed hash determined by linearizing and hashing the data specification discussed above. The verification platform 108 may then compare the hashed credentials against a plurality of hashed data entries in hashed verification data 304A, as indicated by the solid tailed arrow connecting verification platform 108 with hashed verification data 304A. Based on the comparison between the hashed consumer credentials and the hashed verification data 304A, the verification platform may determine a true/false eligibility status. In one example, in response to the hashed consumer credentials matching no hashed data entries in hashed verification data 304A, the verification platform may set the eligibility status to a pre-determined value indicating the consumer is not eligible to access/redeem the gated offer. In one example, the pre-determined value indicating the consumer is not eligible to access/redeem the gated offer may comprise the Boolean value false. In some examples, in response to the hashed credentials matching a single hashed data entry in hashed verification data 304A, the verification platform may set the verification status to a pre-determined value indicating the eligibility claim is validated. In one example, pre-determined value indicating the eligibility claim is valid may comprise the Boolean value true. In some examples, the verification platform may employ a scoring model, wherein an eligibility status is determined to be valid (true) if greater than a threshold score is obtained for the submitted consumer credentials, wherein, for each match between a hashed consumer credential and a hashed data entry of the hashed verification data 304A, a score is assigned based on the data field of the hashed data entry. In some examples, a greater score is assigned to hashed data entries belonging to data fields based on cardinality of the data field.

Following determination of the eligibility status for the eligibility claim of the consumer, the verification platform redirects the consumer device 102 to URL 306A based on the determined eligibility status. In one example, URL 306A comprises a first pre-determined URL selected in response to the verification status indicating the consumer is not eligible to access the gated offer, wherein a webpage corresponding to URL 306A may indicate to the consumer that they are not eligible for the gated offer. The webpage corresponding to URL 306A may further include an option for the consumer to proceed with a purchase or transaction at a standard rate/price. In another example, URL 306A comprises a second pre-determined URL selected in response to the verification status indicating the consumer is eligible to access the gated offer, wherein a webpage corresponding to URL 306A may indicate to the consumer that they are eligible for the gated offer. The webpage corresponding to URL 306A may further include an option for the consumer access/redeem the gated offer, such as by proceeding with a purchase or transaction at reduced rate/price.

Turning to FIG. 3B a second embodiment of a flowchart 300B illustrating consumer traffic during an eligibility status verification process is shown. Elements previously introduced and described in FIGS. 1-2 may retain their numbering in FIG. 3B, and may therefore be discussed only briefly. FIG. 3B includes legend 390B, wherein arrows with dotted tails are shown to indicate consumer traffic (e.g., traffic of a consumer associated with consumer device 102), arrows with solid tails are shown to indicate actions of the verification platform 108, and arrows with dashed tails are shown to indicate actions/data transmission of the verification source 118. FIG. 3B emphasizes data transmission between the consumer device 102, verification platform 108, and verification source 118, which may occur during determination of an eligibility status of a consumer, such as during execution of method 400 shown in FIG. 4 below.

Starting at verification source 118, the verification source 118 pre-computes a hashed dataset and stores the hashed dataset in verification data 304B, as indicated by the dash tailed arrow connecting verification source 118 with hashed verification data 304B. The hashed verification data 304B may be used to support later eligibility status determination by the verification platform 108. Verification source 118 produces the hashed dataset by aggregating a plurality of data entries based on data field, wherein the aggregated data fields are selected based on a data specification agreed upon by the verification source 118 and the verification platform 108. Briefly, the data specification may include one or more data fields and/or canonical formats for arranging data in each data field, prior to hashing, thereby establishing a shared format for producing hashed verification data and hashed consumer credentials, thus enabling efficient comparison. The plurality of aggregated data entries are arranged into the canonical format indicated in the data specification, and each data entry is converted into a distinct HMAC hash using a seed hash. The seed hash comprises a hash value produced from hashing a serialized form of the data specification, and may be used as a key in a keyed hashing algorithm.

Consumer device 102 may access one or more of a plurality of channels 302B, as indicated by the dot tailed arrow connecting consumer device 102 with plurality of channels 302B. Plurality of channels 302B may comprise an e-commerce site, a landing page, an email, a search engine result, a social media website, and an embedded iframe. Each of the plurality of channels 302B may indicate a gated offer, and may re-direct the consumer to verification platform 108 to verify the consumer's eligibility for the gated offer, as indicated by the dot tailed arrow connection plurality of channels 302B with verification platform 108.

Following re-direction of a web browser of consumer device 102 to verification platform 108, a consumer may be prompted to input one or more credentials to validate the consumer's eligibility for the gated offer. As gated offers comprise exclusive offers provided to a specific demographic, consumer credentials may comprise one or more pieces of personal data pertaining to the consumer which may evidence a consumer's claim to belong to a demographic specified in the gated offer. In one example, a consumer credential may comprise a name, a social security number, a birth date, an ID number, an email address, an address, a phone number, or other types of personal data. In one example, the consumer may submit the credentials directly to the verification platform via a 2048-bit Secure Sockets Layer (SSL) encrypted HTTPS. In some examples, consumer credentials may be hashed prior to submission to verification platform 108. The submitted consumer credentials, along with an indication of an asserted eligibility/demographic affiliation of the consumer, may be packaged into an eligibility claim.

Following submission of consumer credentials to verification platform 108, the verification platform may attempt to determine a verification status based on the credentials. In one example, a verification status may comprise a true/false determination of the validity of a claim of eligibility made by a consumer for a gated offer. In some examples, the consumer may submit credentials to a merchant, such as an e-commerce site, and the e-commerce site may generate an eligibility claim based on the credentials, and may transmit the eligibility claim and credentials to the verification platform.

In one example, in the embodiment shown in FIG. 3B, verification platform 108 may determine an eligibility status of a submitted eligibility claim by executing one or more steps of methods 400 and 700A, described in more detail below. Briefly, verification platform 108 hashes the received consumer credentials to produce hashed credentials, using a seed hash determined by linearizing and hashing the data specification discussed above, wherein the data specification is specific to verification source 118. The verification platform 108 may then submit the hashed consumer credentials along with a comparison request to verification endpoint 308B. The verification source 118 may then execute one or more steps of method 700B, to compare the hashed consumer credentials against the hashed dataset stored in hashed verification data 304B. The verification source may return the result of the comparison to the verification platform 108, and the verification platform may use the result to determine a true/false eligibility status.

In one example, in response to the hashed consumer credentials matching no hashed data entries in hashed verification data 304B, the verification platform may set the eligibility status to a pre-determined value indicating the consumer is not eligible to access/redeem the gated offer. In one example, the pre-determined value indicating the consumer is not eligible to access/redeem the gated offer may comprise the Boolean value false. In some examples, in response to the hashed credentials matching a single hashed data entry in hashed verification data 304B, the verification platform may set the verification status to a pre-determined value indicating the eligibility claim is validated. In one example, pre-determined value indicating the eligibility claim is valid may comprise the Boolean value true.

In another example, the verification platform may employ a scoring model to determine the eligibility status based on the comparison(s) between the hashed consumer credentials and the verification data, wherein an eligibility status is determined to be valid (true) if greater than a threshold verification score is obtained for the submitted consumer credentials, wherein, for each match between a hashed consumer credential and a hashed data entry of the hashed verification data 304B, a score is assigned based on the data field of the hashed data entry and a base verification score associated with the verification source. In some examples, a greater score is assigned to hashed data entries belonging to data fields based on cardinality of the data field.

Following determination of the eligibility status for the eligibility claim of the consumer, the verification platform redirects the consumer device 102 to URL 306B based on the determined eligibility status. In one example, URL 306B comprises a first pre-determined URL selected in response to the verification status indicating the consumer is not eligible to access the gated offer, wherein a webpage corresponding to URL 306B may indicate to the consumer that they are not eligible for the gated offer. The webpage corresponding to URL 306B may further include an option for the consumer to proceed with a purchase or transaction at a standard rate/price. In another example, URL 306B comprises a second pre-determined URL selected in response to the verification status indicating the consumer is eligible to access the gated offer, wherein a webpage corresponding to URL 306B may indicate to the consumer that they are eligible for the gated offer. The webpage corresponding to URL 306B may further include an option for the consumer to access/redeem the gated offer, such as by proceeding with a purchase or transaction at reduced rate/price.

Turning to FIG. 4, an example method 400 for determining an eligibility status of an eligibility claim using a verification platform is shown. In one example, method 400 may be executed by verification platform 108, described in more detail above, using instructions stored in non-transitory memory. Method 400 may enable automatic and flexible determination of a consumer's eligibility for a gated offer by intelligently selecting one or more verification sources based on the eligibility claim and the consumer credentials submitted to evidence the eligibility claim.

Method 400 begins at operation 402, wherein the verification platform receives an eligibility claim and consumer credentials. In one example, a verification platform may receive an eligibility claim and consumer credentials from a merchant device at a REST API, such as REST API 110. In another example, the verification platform may receive the consumer credentials from a consumer device, at a REST API, or other communication endpoint. The eligibility claim may be generated by a merchant device in response to consumer submitted credentials to gain access to a gated offer or protected content provided by the merchant. In one example, an eligibility claim may comprise an asserted institutional affiliation (student, teacher, military, employee of a specific business etc.), or an asserted demographic status (child, senior citizen, disabled, low income, etc.) made by a consumer to gain access to a gated offer or protected content, and may include consumer credentials evidencing the asserted affiliation, such as age, name, birthdate, address, ID number, etc. In another example, consumer credentials may comprise a signed or otherwise externally authenticated piece of evidence, such as an SAML assertion or a digitally-signed credential. Consumer credentials may comprise a plurality of data fields, and the data fields may be indicated by the eligibility claim.

At operation 404, the verification platform compiles a verification source list based on the eligibility claim and the credentials. The verification platform may comprise a verification source database, such as verification source database 116, which may include a plurality of verification sources. In one example, the plurality of verification sources listed in the verification source database may comprise one or more of a cloud database, a university website, a government website, a public LDAP directory, an email loop, a call center, document review data, single-sign-on, IP address lookup, and machine-learning based data sources. The plurality of verification sources stored in the verification source database may include metadata indicating one or more credential types (data fields) each verification source is capable of corroborating. The verification platform may add verification sources to the verification source list based on the submitted consumer credentials matching the credential type (data field) for which the verification source may provide corroboration. In another example, based on the received eligibility claim asserting consumer affiliation with an institution, the verification platform may select verification sources comprising data pertaining to the institution to the verification source list. For example, based on an eligibility claim asserting employment at business Z, the verification platform may select verification sources with employment records for business Z, and add the verification sources to the verification source list. In another example, the verification platform may utilize synchronous and/or asynchronous verification sources, to accommodate non-real time verification responses that require offline activity to complete verification.

Next at operation 406, the verification platform selects one or more verification sources, such as a first verification source, from the verification source list, which may be based on a predetermined priority, a real-time determined priority based on the eligibility claim, the type credentials submitted, or combinations thereof. In one example, verification sources included in the verification source list may be assigned a priority ranking based on one or more of an amount of verification data held by the verification source, an anticipated speed of the verification source, a probability of resolving the eligibility claim using the verification source (as used herein, resolving an eligibility claim will be understood to refer to conclusively determining an eligibility status for the eligibility claim), and an accuracy of the verification source. The verification platform may select verification sources from the verification source list in order of priority ranking, wherein a highest ranked verification source may be selected first. In another example, the verification platform may divide verification sources in the verification source list into tiers, based on priority ranking, wherein a tier of verification sources may be selected simultaneously. In some examples, all verification sources of the verification source list may be selected in parallel.

At operation 408, the verification platform compares the consumer credentials against verification data from the one or more verification sources selected at operation 404. In one example, the verification platform may compare consumer credentials against verification data by performing one or more steps of method 500, wherein consumer credentials are hashed and directly compared to a hashed dataset obtained from the selected verification source and hosted by the verification platform. In another example, the verification platform may compare the consumer credentials against verification data held by the selected verification source by employing one or more steps of method 700A, wherein consumer credentials are hashed and transmitted to a verification source. Once the hashed consumer credentials are received by the verification source, the hashed credentials may be compared to a hashed dataset, by employing one or more steps of method 700B. Comparison of hashed credentials against a hashed dataset may comprise determining if one or more of the hashed consumer credentials are numerically equivalent to a hashed data entry of the hashed dataset. Comparison of consumer credentials against verification data may result in a true/false result, wherein a value of true is returned if the consumer credential matched one or more data entries in the verification data, and wherein a value of false is returned if the consumer credential matched no entries of the verification data.

At operation 410, the verification platform may store a result of the comparison determined at operation 406. In one example, the verification platform may store a hashed form of the consumer credential, the verification source(s) used, and the result of the comparison (TRUE/FALSE, match/no match) in non-transitory memory of the verification platform. By storing comparison results for consumer credentials, an aggregate verification result, also referred to herein as an eligibility status, may be updated/determined.

At operation 412, the verification platform may determine an eligibility status, or update an eligibility status, based on the result of the current comparison, and previous comparisons. In one example, operation 410 includes determining an eligibility status according to the following pseudo code:

If ($\Sigma_{i=0}^{n} D_i V_i M_i \geq$ Threshold)
    Eligibility status = TRUE;
Else
    Eligibility status = FALSE;

Wherein n is the current total number of comparisons for an eligibility claim (n may increase with each comparison), i is an index for iterating over previous comparisons, $M_i$ is a result of comparison i, wherein $M_i=0$ if no match is found for comparison i, and $M_i=1$ if a match was found for comparison i, $V_i$ is a verification source modifier, wherein each verification source may have a corresponding verification source modifier determined by the verification platform, and $D_i$ is a data field modifier, wherein each type of data field may have a data field modifier determined by the verification platform. In one example, a verification platform may determine a verification source modifier based on historical data of comparisons conducted using verification data from the verification source. In one example, a data field modifier may be determined for each of a plurality of data fields by the verification platform. In one example, a data field modifier may increase with the cardinality of the data field. In another example, a data field modifier may increase or decrease as the historical accuracy of eligibility statuses determined using the data field increase or decrease. In another example, a verification source modifier may increase or decrease as the accuracy of eligibility statuses determined using the data field increases or decreases. The threshold may be set based on the particular eligibility claim being evaluated. The threshold may be dynamically updated by the verification platform based accuracy of eligibility statuses.

In one example, a verification platform may implement an optimistic model, wherein, in reference to the above pseudo code, $D_i$ and $V_i$ are set to 1, and Threshold is set to 1. In an optimistic model, in response to a single match between consumer credentials and verification data, the verification platform may set the value of the eligibility status to a pre-determined value indicating the eligibility claim is verified (e.g., TRUE). In another example, the verification platform may employ a scoring model, wherein each match between a consumer credential and verification data may receive a score according to a pre-determined scoring scheme, and an eligibility claim is verified in response to submitted consumer credentials exceeding a threshold score. In reference to the above pseudo code, the pre-determined scoring scheme may comprise setting $D_i$ and $V_i$ based on the data field and verification source, respectively, as discussed above. Larger values of $D_i$ and $V_i$ indicates a higher confidence that a match with the data field from the verification source corresponds to a valid eligibility claim. In another example, the result of the current comparison, and the results from the previous comparisons, may be fed into a statistical model or neural network, and an eligibility status may be determined based on output from the statistical model or neural network.

At operation 414, the verification platform determines if the confidence of the eligibility status is above a threshold.

In one example, the verification platform may determine a confidence of a current eligibility status based on the number and type of matches between the verification data and the consumer credentials. In one example, a base confidence rating may be assigned to each verification source, and each verification data field of the verification source may be assigned a confidence rating modifier, wherein a confidence of an eligibility status determined based on a match between a consumer credential and data field of a verification source may be determined by multiplying the base confidence rating of the verification source, by the confidence rating modifier of the data field. In one example, a base confidence rating of a verification source may be based on historical data obtained from previous eligibility status verifications, and the confidence rating modifiers may be based on one or more properties of the data field. In one example, a confidence rating modifier for a five digit pin number may be higher than a confidence rating modifier for a four digit pin number.

If at operation 414, the verification platform determines that the confidence of the eligibility status is below the threshold, method 400 may proceed to operation 416, wherein the verification platform evaluates if additional verification sources are included in the verification source list compiled at 404. The verification platform may respond to a determination that the verification source list includes additional verification sources by proceeding to select the next verification source from the verification source list, at operation 418. At operation 418, the verification platform may select the one or more next verification source(s) according to a priority ranking or other selection scheme, as discussed above with reference to operation 406. Method 400 may return to operation 408, until either the confidence of the eligibility status increases above the threshold, or until there are no additional verification sources in the verification source list.

If at operation 414 is determined that the confidence of the eligibility status is above the threshold, or if at 416, it is determined that there are no additional verification sources in the verification source list, method 400 proceeds to operation 420. At operation 420, the verification platform stores the determined eligibility status, and purges personally identifying details of the consumer. In one example, the verification platform may permanently delete personal data of the consumer, such as name, birthdate, address, phone number, email, etc., but may save the determined eligibility status, along with an anonymized eligibility claim, for future reference. In one example, the verification platform may associate a unique token or identifier with the determined eligibility status, enabling a merchant to later audit the verification process.

Next at operation 422, the verification platform transmits the determined eligibility status to the requester. In one example, the verification platform may further re-direct a web browser or app of a consumer device to a pre-determined URL based on the determined eligibility status. In one example, the verification platform may re-direct a web browser of a consumer device to a first URL in response to an eligibility status indicating the consumer is eligible for the gated offer, and may re-direct the web browser of the consumer device to a second URL in response to the eligibility status indicating the consumer is not eligible for the gated offer. In another example, in response to the eligibility status of the eligibility claim being true, a verification platform may transmit an access code to a consumer device, wherein the access code may enable the consumer device to access the gated offer or protected content. Following operation 422, method 400 may end.

In this way method 400 enables a verification platform to perform automated eligibility claim verification, using a variety of credentials, and a plurality of verification sources, enabling fast, and flexible determination of a consumer's eligibility for a gated offer. A technical effect of intelligently selecting verification sources based on received consumer credentials is that an eligibility status may be determined more rapidly, and with less computational resources than in a conventional system, as verification sources capable of corroborating consumer credentials may be selected, while verification sources incapable of corroborating the consumer credentials may not be selected. Further, by assigning a priority ranking to selected verification sources, verification sources with a greater chance of validating an eligibility claim may be selected before verification sources with a lower probability of validating the eligibility claim.

Turning to FIG. 5, an example method 500 for comparing consumer credentials against a hashed verification dataset, is shown. In one example, method 500 may be executed by verification platform 108, based on instructions stored in non-transitory memory. Method 500 may be executed as part of method 400, as indicated at operation 408. Method 500 may enable verification of an eligibility claim of a consumer, while reducing a probability of personal data of the consumer being exposed. Further, method 500 enables a data provider a greater degree of control over licensed data, and a degree of traceability to licensed data assets.

Method 500 begins at operation 502, where the verification platform accesses a hashed dataset previously obtained from the selected verification source (as method 500 may be executed as part of method 400, it will be understood that the verification source refers to a data source selected at operation 406 or 418, of method 400). In one example, the verification platform may have previously obtained a hashed dataset from the verification source, in response to a data request, as discussed in more detail in FIG. 6A and FIG. 6B. In one example, the verification platform may host the previously obtained hashed dataset within a database maintained by the verification platform. In another example, the verification platform may remotely access the hashed dataset through the cloud.

Next, at operation 504, the verification platform accesses a seed hash ($H_0$) associated with the hashed dataset. In one example, verification sources may provide a data specification with a hashed dataset, wherein the data specification describes one or more properties of the hashed data entries of the hashed dataset, and may further include one or more terms of use for the hashed dataset. The verification platform may determine a seed hash for the hashed dataset by serializing and hashing the corresponding data specification, using a pre-agreed upon hashing algorithm.

At operation 506, the verification platform may apply $H_0$ to the consumer credentials, to produce hashed credentials (also referred to herein as hashed consumer credentials). In one example, the verification platform may employ a keyed-hash method authentication code (HMAC) algorithm to generate hashed credentials from un-hashed credentials, using $H_0$ as a key. Briefly, HMAC uses two passes of hash computation. The key ($H_0$) is first used to derive two keys, inner and outer. The first pass of the algorithm produces an internal hash derived from the credentials and the inner key. The second pass produces the final HMAC code (the hashed credentials) derived from the inner hash result and the outer key. HMAC algorithms may be used in conjunction with substantially any cryptographic hashing algorithm, including SHA-256 and SHA-3. A technical effect of using $H_0$ as an HMAC key, is that the hashed dataset is cryptographically linked with the data specification (and the data usage agreement/data licensing agreement terms indicated therein), and therefore, leaked hashed data may be traced to the data specification pertaining to the leak.

At operation 508, the verification platform may select a first hashed data entry from the hashed dataset. In one example, the verification platform may select a first hashed data entry according to a priority ranking, wherein the verification platform may assign a priority ranking to each data field included in a hashed dataset.

At operation 510, the verification platform compares the hashed credentials against the selected hashed data entry. Comparing the hashed data entry with the hashed credentials may comprise a numerical comparison, wherein the numerical value of the hashed credentials is compared to the numerical value of the hashed data entry, and in response to the numerical value of the hashed data entry and the hashed credential being equal, determining that the hashed credential and the hashed data entry match. In one example, the hashed credentials comprise a plurality of different hashes, generated for various data fields of the credentials. For example, a consumer may provide a first name, last name, birthdate, and institution ID number, and the first name, last name, birthdate may be arranged into a pre-determined order/format, and hashed using the seed hash, to produce a first hashed credential, and the institution ID number may be separately hashed using the seed hash, to produce a second hashed credential. Each of a plurality of hashed credentials may be compared against the selected hashed data entry at operation 510.

At operation 512, it is determined if the hashed credentials matched the hash data entry. If one or more of the hashed credentials is determined to be numerically equivalent/identical to the selected hashed data entry, method 500 may proceed to operation 518, where the result of the comparison is returned to the caller (e.g., method 500 may comprise a subroutine of another routine executed by the verification platform, such as method 400, and the result of the comparison may be returned to the higher level method). Following operation 518, method 500 may end.

However, if at operation 512, it is determined that none of the hashed credentials matched the selected hashed data entry, method 500 may proceed to determine if additional data entries are included in the hashed dataset, as indicated at operation 514. If no additional data entries are included in the hashed dataset, method 500 may proceed to return the result of the comparison to the caller, and method 500 may end.

However, if at operation 514 it is determined that the hashed dataset includes one or more additional hashed data entries, method 500 may select the next entry in the hashed dataset, as indicated at operation 516, and return to operation 510. The newly selected hashed data entry may then be compared with the hashed credentials, until either a match between is found, or no additional, un-compared, hashed data entries remain in the hashed dataset.

In this way, a verification platform may rapidly, and anonymously, compare consumer credentials against a hashed verification dataset hosted by the verification platform. An advantage of method 500 is that the verification source may satisfy a verification platform's request for data, without exposing underlying personal information of its users. A technical effect of comparing hashed consumer credentials against a hashed dataset maintained by the verification platform, is that an eligibility status determination may be achieved more rapidly, as the hashed dataset is pre-computed and previously obtained.

Figure 6A:
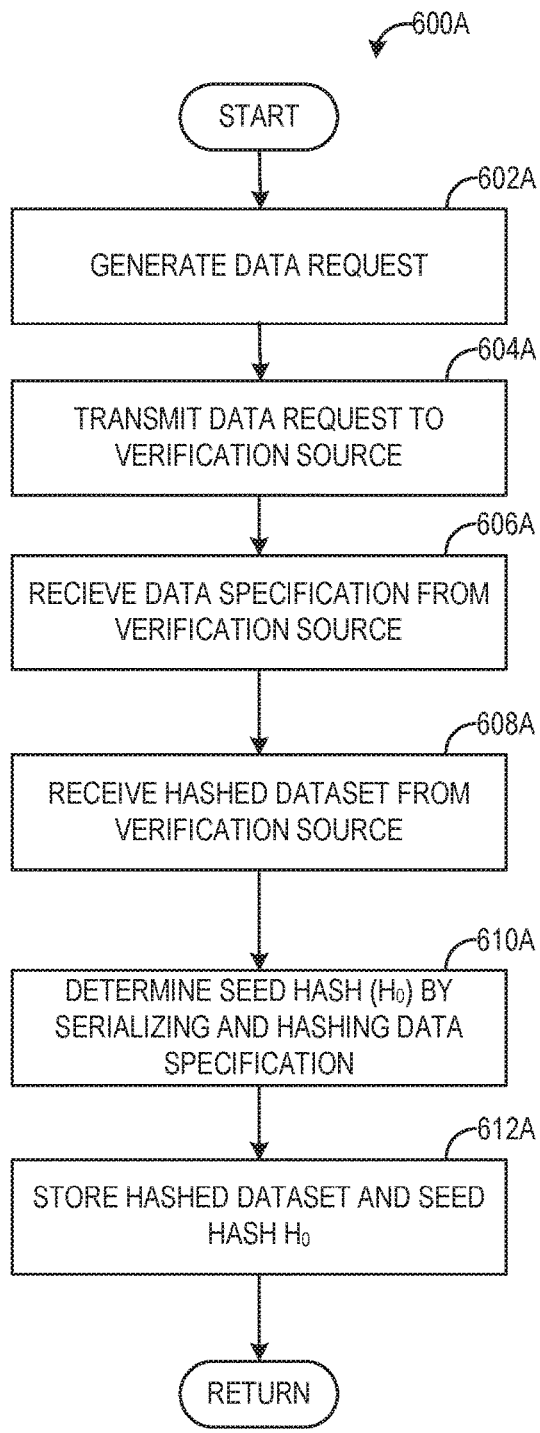
FIG. 6A shows a flowchart of an exemplary method for a verification platform to acquire a hashed dataset form a verification source.
Figure 6B:
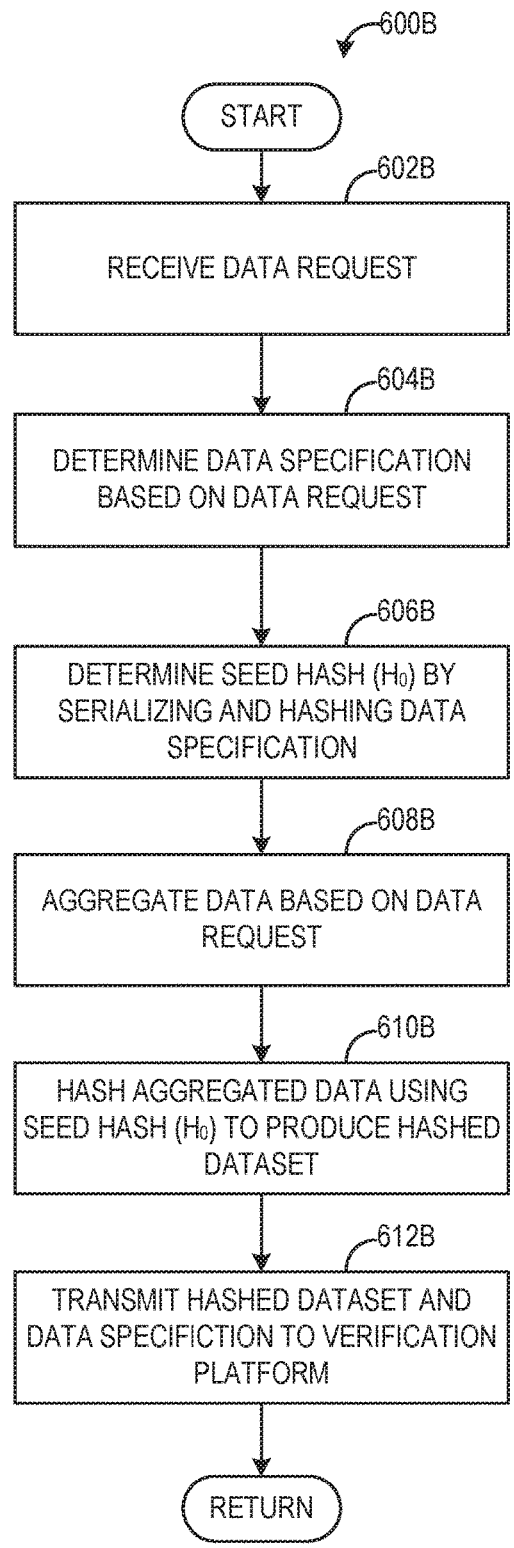
FIG. 6B shows a flowchart of an exemplary method for a verification source to generate a hashed dataset for a verification platform.

FIGS. 6A and 6B, show paired methods 600A and 600B, which may be implemented by a verification platform, and verification source, respectively, to facilitate eligibility status determination. Methods 600A and 600B may be executed as part of method 500, as indicated at operation 502. FIG. 6A is from the perspective of a verification platform, and comprises an example method 600A for requesting and storing verification data from a verification source. FIG. 6B is from the perspective of a verification source, and shows one example method by which a verification source may provide verification data to a verification platform, while reducing a probability of data exposure.

Method 600A begins at 602A, where the verification platform generates a data request for verification data maintained by a verification source. The verification platform may determine which data assets of the verification source may evidence a consumer's eligibility claim, and may request these data assets from the verification source by transmitting a data request to the verification source (data assets may also be referred to as verification data). In one example, the data request may indicate one or more data fields. The verification platform may request the one or more data fields based on a gated offer provided by a merchant, wherein the verification platform has agreed to perform verification of eligibility claims made by consumers for the gated offer. As gated offers may be targeted to particular demographics, data fields which may evidence affiliation with the demographics associated with a particular gated offer may be requested by the verification platform.

Next, at operation 604A, the verification platform transmits the data request to the verification source. In one example, the verification platform transmits the data request to the verification source via communication subsystem 210.

Referring to operation 602B of method 600B, the verification source may receive the data request generated by the verification platform at operation 602A of method 600A. In one example, the verification source may receive the data request at a REST endpoint.

Next, at operation 604B, the verification source may determine a data specification for the requested data. In one example, at operation 604B, the verification source may determine a canonical format for each of the requested data fields, and determine one or more terms of use for the hashed dataset. The data specification may describe the licensed data, and may include issuer name and identifying details (domain name, social media identity and cryptographic signature produced by a private key of the issuer), the claim(s) being made about the data provided, one or more hashing strategies used to compute lookup keys for the data provided, a description of any attributes that may be provided alongside each hashed data entry, an enumeration of the terms of use for the data being licensed, including license period (start and end dates), royalty/revenue share details, specific parties that are allowed to query the data, timestamp of the data specification and/or a nonce value.

The following is an example of a data specification generated by a verification source (verification source X), wherein verification source X is making available data for the purpose of verifying claims of employment valid through the end of the quarter and available to 2 specific searching parties/accounts identified by 5cd976284bb1a4787c70bc40 and 5cd976294bb1a4787c70bc41.

Issuer:
Name: verification source X
   Identity: <signature>
Claim:
Affiliation:
   Type: Employee
   Organization: Company Y
DefinedHashes:
PersonHashV1:
   "FIRST NAME"
   "LAST NAME"
   "BIRTH DATE"
PersonHashV1:
   "EMAIL"
Attributes:
"JobTitle"
"HireDate"
Terms:
Expires: "Wed Jul 31 23:59:59 EDT 2019"
AllowedAccountIds: ["5cd976284bb1a4787c70bc40", "5cd976294bb1a4787c70bc41"]
Nonce:
"99cdee6da33682f230792b0dba3adc73b42f344e"
Timestamp: "Thu May 2 16:31:22 EDT 2019"

Once the verification source has generated a data specification for the data to be licensed, method 600B proceeds to operation 606B. At operation 606B the verification source determines a seed hash ($H_0$) by serializing and hashing the data specification. In one example, the data specification may comprise a serialized data format, such as JSON or YAML, and therefore may not require serialization. In another example, the data specification may comprise data in a non-serialized format, and the verification platform may convert the data specification into a serialized format known in the art, such as JSON or YAML. The verification source may determine a seed hash ($H_0$) from a serialized data specification by hashing the data specification using a pre-determined hashing function. In one example, the verification source may determine a seed hash by passing the serialized data specification as an argument to an SHA-256 hashing algorithm.

Next, at operation 608B, the verification source aggregates verification data based on the data fields indicated by the data request. In one example, the verification source filters a plurality of data entries in one or more database, according to data field, wherein data fields matching the data fields indicated in the verification request may be selected, and data fields not indicated by the data request may be filtered out. In another example, aggregating the verification data may comprise selecting a data entry from a verification database of the verification source, comparing the data field of the selected data entry with the requested data fields, and responding to the data entry matching the requested data fields by aggregating the data entry with the plurality of data entries.

The verification source may arrange the aggregated data into one or more canonical formats. In one example, the verification source may determine a canonical format for one or more data fields, and may include the canonical format in the data specification. In one example, a canonical format may comprise arranging one or more data entries belonging to one or more data fields, into a sequence, wherein the sequence is indicated in the canonical format.

As an example, suppose there is a verification source providing to a verification platform the following fields:
First Name
Middle Name
Last Name
Birth Year
Birth Month
Zip/Postal Code
Phone Number.

As an example, this data is to be matched using credentials comprising the data fields: Last Name, Birth Year and Postal Code. The verification source may arrange the data in its canonical format: BIRTH_DATE.year=1993&LAST_NAME=smith& POSTAL_CODE=97405.

At operation 610B, the verification source may hash the aggregated and canonically formatted data using $H_0$. In one example, the verification source may hash the aggregated and canonically formatted data using an HMAC-SHA-256 algorithm, wherein $H_0$ is used as the HMAC key. In one example, each aggregated and canonically formatted data entry, or composite data entry (wherein a composite data entry comprises more than one data entry arranged into a canonical format) may be hashed separately, thereby producing a plurality of hashed data entries.

Next, at operation 612B, the verification source may transmit/share the hashed dataset and the corresponding data specification (the data specification determined at 604B), to the verification platform of operation 604A. In one example, the verification source may share an address of a database storing the hashed dataset, and the verification platform may access the hashed dataset remotely. In another example, the verification platform may store the hashed dataset in an internal database, thereby reducing latency of queries. Following operation 612B, method 600B may end. In this way, method 600B enables a verification source to share verification data with a verification platform, in a secure, traceable manner, by hashing verification data using a seed hash derived from a data specification corresponding to the licensed verification data.

Returning to operation 606A of method 600A, the verification platform receives the data specification from the verification source. Next, at operation 608A, the verification platform receives the hashed dataset from the verification source. In one example, the verification platform may receive an address pointing to a location in memory of the hashed dataset, and/or the data specification.

Next, at operation 610A, the verification platform may determine the seed hash ($H_0$), in the same manner as described in reference to operation 606B of method 600B. Briefly, the verification platform may determine a hashing algorithm indicated in the data specification, and may employ the hashing algorithm to determine a hash corresponding to the data specification (referred to herein as the seed hash, $H_0$).

Once $H_0$ is determined for the received, hashed dataset, the verification platform may store the $H_0$ in non-transitory memory for later access, as indicated at operation 612A. In one example, the verification platform may store $H_0$ in a location of memory associated with the hashed dataset, thereby facilitating rapid and efficient look-up of $H_0$ during later eligibility status determination. Following operation 612A, method 600A may end.

In this way, methods 600A and 600B enable a verification platform to request and host verification data provided by a verification source, without giving the verification platform access to the underlying verification data. Thus, the verification platform is enabled to rapidly determine eligibility statuses for eligibility claims, in an anonymized fashion. A technical effect of performing eligibility status determinations by comparing hashed consumer credentials with hashed verification data is that a probability of data exposure is reduced, as no personally identifying details are used in the comparison. A technical effect of generating hashed consumer credentials and hashed verification data using a same seed hash ($H_0$), derived from a data specification describing the licensed data and the terms of the data license/data use agreement, is that, in the case of a data exposure, or breach of agreement, the exposure/breach may be traced to a specific data specification.

FIGS. 7A and 7B, show paired methods 700A and 700B, which may be implemented by a verification platform, and verification source, respectively, to facilitate eligibility status determination. Methods 700A and 700B may be executed as part of method 400, as indicated at operation 408. FIG. 7A is from the perspective of a verification platform, and comprises an example method 700A for hashing consumer credentials and transmitting the hashed consumer credentials to a verification source for external comparison against verification data held by the verification source. FIG. 7B is from the perspective of a verification source, and shows one example method by which a verification source may receive hashed consumer credentials and a comparison request, generate a hashed dataset based on the comparison request, and compare the hashed consumer credentials against the hashed dataset.

Operation 700A begins at operation 702A, wherein a pre-determined data specification for the currently selected verification source is accessed. In one example, the verification platform and verification source may have an active data licensing agreement, and as part of the agreement, the verification source may provide the verification platform with a data specification, such as the data specification discussed herein. In one example, the verification platform may store a plurality of data specifications for a plurality of verification sources, wherein each verification source may be indexed by the one or more verification sources to which the data specification applies.

At operation 704A, the verification platform may determine a seed hash ($H_0$) by serializing and hashing the data specification accessed at operation 702A. In one example, the data specification may comprise a serialized data format, such as JSON or YAML, and therefore may not require serialization. In another example, the data specification may comprise data in a non-serialized format, and the verification platform may convert the data specification into a serialized format known in the art, such as JSON or YAML. The verification platform may determine a seed hash ($H_0$) from a serialized data specification by hashing the data specification using a pre-determined hashing function. In one example, the verification platform may determine a seed hash by passing the serialized data specification as an argument to an SHA-256 hashing algorithm. Alternatively, the verification platform may have previously determined $H_0$ for the currently selected verification source, in which case operation 704A may comprise accessing the previously determined $H_0$.

Next, at operation 706A, the verification platform may hash consumer credentials, such as the consumer credentials received at operation 402 of method 400, using $H_0$. In one example, the consumer credentials comprise a plurality of data fields, and the data specification may indicate a canonical format for the one or more data fields. The verification platform may arrange the credentials according to the one or more canonical formats indicated by the data specification, and may compute a hash for each canonically arranged credential (or credentials), according to an HMAC algorithm, wherein $H_0$ is used as an HMAC key.

Next, at operation 708A, the verification platform may generate a comparison request, which may indicate one or more instructions for comparing the hashed credentials with verification data, for a recipient verification source. The comparison request may indicate one or more data fields of the hashed consumer data (consumer, customer, and user, are used interchangeably herein), thus enabling a verification source to determine which data fields to compare the hashed credentials against.

At operation 710A, the verification platform may transmit the hashed consumer credentials to the selected verification source. At operation 712, the verification platform may transmit the comparison request to the selected verification source. In one example, the comparison request may include the hashed consumer credentials. In one example, the verification platform transmits the hashed consumer credentials and the comparison request to a verification endpoint of a verification source, such as verification endpoint 308B shown in FIG. 3B.

Referring to operation 702B of method 700B, the verification source receives the hashed consumer data transmitted at operation 710A. Similarly, at operation 704B the verification source receives the comparison request generated by the verification platform at operation 712A. The comparison request may indicate one or more data fields to which the hashed consumer credentials belong, thereby enabling the verification source to determine which of verification data to compare the hashed consumer credentials against.

At operation 706B, the verification source selects a pre-determined data specification, wherein the pre-determined data specification of operation 706B may be equivalent to the pre-determined data specification of operation 702A. In one example, the comparison request indicates a pre-determined data specification for the verification source to use to hash the verification data.

At operation 708B, the verification source may generate the seed hash ($H_0$) using the pre-determined data specification, in a manner substantially similar to that discussed at operation 704A. Alternatively, the verification source may have previously determined $H_0$ for the selected pre-determined data specification, and in such cases operation 708B may comprise accessing the previously determined $H_0$ from a location in non-transitory memory.

At operation 710B, the verification source may aggregate verification data based on the data fields indicated by the comparison request. In one example, the verification source may filter a plurality of data entries in one or more database, according to data field, wherein data fields matching the data fields indicated in the comparison request may be selected, and data fields not indicated by the comparison request may be filtered out. In another example, aggregating the verification data may comprise selecting a data entry from a verification database of the verification source, comparing the data field of the selected data entry with the data fields indicated by the comparison request, and responding to the data entry matching the requested data fields by aggregating the data entry with the plurality of data entries.

The verification source may arrange the aggregated data into one or more canonical formats. In one example, the verification source may arrange the aggregated verification data according to a canonical format indicated by the pre-determined data specification. In one example, arranging the aggregated data into the canonical format may comprise arranging one or more data entries belonging to one or more data fields, into a sequence, wherein the sequence is indicated in the canonical format.

At operation 712B, the verification source may hash the aggregated and canonically formatted data using $H_0$. In one example, the verification source may hash the aggregated and canonically formatted data using an HMAC-SHA-256 algorithm, wherein $H_0$ is used as the HMAC key. In one example, each aggregated and canonically formatted data entry, or composite data entry (wherein a composite data entry comprises more than one data entry arranged into a canonical format and used to produce a single hash value) may be hashed separately, thereby producing a plurality of hashed data entries. Alternatively, the verification source may pre-compute the verification data, by performing operations 710B-712B prior, to operation 702B, thereby enabling more rapid comparison of hashed consumer credentials with hashed verification data.

Next, at operation 714B, the verification source may compare the hashed credentials received from the verification platform with the hashed verification data produced at operation 712B. Comparing the hashed consumer credentials with the hashed verification data may comprise a numerical comparison, wherein the numerical value of the hashed credentials is compared to the numerical value of the hashed verification data, and in response to the numerical value of the hashed verification data and the hashed consumer credentials being equal, determining that the hashed credentials match the hashed verification data. In an example, operation 714B may comprise comparing a plurality of hashed consumer credentials against a plurality of hashed data entries of the verification data, and determining the result of a plurality of comparisons. In one example, the hashed verification data comprises a plurality of hashed data entries, and comparing the hashed customer data with the hashed verification data comprises, selecting a first hashed data entry from the plurality of hashed data entries, and determining if the hashed customer data is numerically equivalent to the hashed data entry, and responding to the hashed customer data being numerically equivalent to the hashed data entry by setting the result to a pre-determined value indicating the hashed customer data matched the hashed verification data.

At operation 716B, the verification source returns the result of the comparison to the verification platform of operation 712A. In one example, the result may indicate which credentials matched the verification data, and which credentials did not match the verification data. In one example, for each hashed consumer credential of the hashed consumer credentials, the verification source may determine a true/false result of the comparison between said credential and the hashed verification data. Following operation 716B, method 700 may end.

Returning to operation 714A, the verification platform may receive the result of the comparison between the hashed consumer data and the hashed verification data, as may be determined at operation 714B of method 700B. Following operation 714A, method 700A may end, and the received result may be passed to method 400, as indicated at operation 408, for use in determining an eligibility status of an eligibility claim.

In this way, method 700A and 700B may enable a verification platform to determine an eligibility status for an eligibility claim, without directly holding or hosting the verification data. Additionally, methods 700A and 700B enable a verification platform to securely transmit a consumer credential with an external verification source, by first hashing the consumer credential according to a pre-agreed upon data specification.

Turning to FIG. 8, an example timeline 800 is shown. Timeline 800 shows communication between a consumer device, a merchant device, a verification platform, and a verification source, such as may occur during execution of a method for determining an eligibility status of a consumer. In particular, timeline 800 emphasizes communication between the various devices of eligibility claim verification system 100, implementing method 400, in conjunction with method 500, 600A, and 600B.

Timeline 800 begins with operation 802, wherein the verification platform requests verification data from a verification source. The verification platform may determine which data assets of the verification source are able to evidence a consumer's eligibility claim, and may request these data assets from the verification source by transmitting a data request to the verification source (data assets may also be referred to as verification data). In one example, the data request may indicate one or more data fields. The verification platform may request the one or more data fields based on a gated offer provided by a merchant, wherein the verification platform has agreed to perform verification of eligibility claims made by consumers for the gated offer. As gated offers may be targeted to particular demographics, data fields which may evidence affiliation with the demographics associated with a particular gated offer may be requested by the verification platform. In one example, the verification platform may generate a message indicating one or more requested data fields, and may transmit the data request to a communicatively coupled verification source. In one example, the verification platform may transmit the data request to an API of a verification source.

Next, at operation 804, the verification source may receive the data request from the verification platform. At 806, the verification source may produce a hashed dataset by filtering a plurality of data entries of the verification source, based on the data request, and hashing each of the filtering data entries using a seed hash derived from a data specification. The verification source may then transmit the hashed dataset to the verification platform, as indicated at 808.

At operation 810, the verification platform may receive the hashed dataset, along with a data specification defining one or more of the data fields included within the hashed data set. The verification platform may store the hashed dataset and credentials in non-transitory memory.

Turning to the consumer device, at operation 811, a consumer attempts to gain access to a gated offer provided by the merchant. In one example, operation 811 may comprise a consumer selecting a gated offer solicitation produced by the merchant, wherein the gated offer solicitation indicates one or more offers/content accessible to verified members of a pre-determined demographic. The gated offer solicitation may be presented to a consumer via a display of the consumer device, through one or more channels, including an e-commerce site, an email, a text, a webpage, etc. Upon selection of the gated offer solicitation, a merchant device may be informed of the consumer's attempt to access the gated offer.

At operation 812, the merchant device receives an indication of the consumer's attempt to access the gated offer. The merchant may perform an initial assessment of the consumer's eligibility for the gated offer, and may either authorize, or reject, the consumer's attempt to access the gated offer. In the example shown in FIG. 8, the merchant device authorizes the consumer's eligibility claim for the gated offer, and presents the consumer with one or more fields wherein the consumer may provide credentials in support of the eligibility claim for the gated offer.

At operation 814, a consumer may enter credentials for the gated offer into one or more fields. In one example, the gated offer may be displayed to the user via a display of the consumer device, along with one or more fields for entering credentials to verify eligibility for the gated offer. Each field may be associated with a distinct credential type, and the data input into the one or more fields may be automatically tagged/labeled as belonging to the credential type. In one example, credential types may include, name, address, age, institutional affiliation, institution ID, or other types of data capable of evidencing a consumer's affiliation with a demographic.

At operation 816, the consumer device may transmit the eligibility claim and the consumer credentials to the verification platform. In another example, the merchant device may transmit the eligibility claim to the verification platform, and the consumer device may separately transmit the consumer credentials to the verification platform, in such examples, the consumer credentials and the eligibility claim may be linked via a unique identification number, thereby enabling the verification platform to determine that a received eligibility claim is associated with a separately received consumer credential.

At operation 818, the verification platform may receive the eligibility claim and credentials from the consumer device. In example timeline 800, the consumer device may also be referred to as a requester, as the consumer device transmits the consumer credentials and the eligibility claim. At operation 820, the verification platform may hash the received consumer credentials, and delete personally identifying details of the eligibility claim (this may also be referred to herein as un-identifying the consumer, or anonymizing the data). At operation 822, the verification platform queries the hashed dataset received from the verification source, to determine if the hashed consumer credentials match one or more hashed data entries therein. Based on the number and types of matches, wherein a type of match refers to the data field(s) of the matched credential/verification data, the verification platform may determine an eligibility status for the eligibility claim received at operation 818. In one example, an eligibility status comprises either true, indicating the consumer is eligible for the gated offer, or false, indicating the consumer is not eligible for the gated offer. At operation 824, the verification platform transmits the eligibility status to the merchant device.

The merchant device receives the determined eligibility status at operation 826, and at operation 828 the merchant device provides, or declines, access to the gated offer based on the eligibility status. In one example, the merchant device may re-direct the consumer device to a pre-determined URL based on the eligibility status. In one example, in response to an eligibility status of "true," the merchant device may re-direct a web browser of the consumer device to a first URL, wherein the firs URL may enable the consumer to access the gated offer. In another example, in response to an eligibility status of "false," the merchant device may re-direct the web browser of the consumer to a second URL, wherein the second URL may not enable the consumer to access the gated offer. In another example, the merchant device may transmit, or not transmit, a reward code to the merchant device, based on the eligibility status, wherein the reward code may enable a consumer to redeem a gated offer.

At operation 830, based on the eligibility status determined by the verification platform, the consumer is either granted access to the gated offer, or provided a non-gated offer. In one example, a consumer device may receive a reward code in response to the eligibility status of the eligibility claim indicating that the user is eligible to receive the gated offer. Following operation 830, timeline 800 may end.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   receiving, by a verification platform through a network, an eligibility claim from a device;
   receiving, by the verification platform, credentials in support of the eligibility claim from the device;
   determining, by the verification platform, a seed hash by:
      serializing a data specification pertaining to a hashed dataset, the data specification being a data licensing agreement for the hashed dataset agreed upon by a verification source and the verification platform; and
      hashing the serialized data specification using a pre-determined hashing algorithm;
   hashing, by the verification platform, the received credentials using the seed hash to produce hashed credentials;
   transmitting, by the verification platform, a comparison request, wherein the comparison request includes the hashed credentials to the verification source;
   in response to transmitting the comparison request, receiving, by the verification platform, a result of the comparison between the hashed credentials and hashed dataset at the verification source;
   storing, by the verification platform, the comparison result;
   determining, by the verification platform, the eligibility claim is invalid based on the hashed credentials not matching any of the hashed dataset of the comparison result; and
   transmitting, by the verification platform through the network, the eligibility claim is invalid to the device.

2. The method of claim 1, the method further comprising:
responding to the hashed credentials matching greater than a threshold number of hashed data entries by:
determining the eligibility claim is valid.

3. The method of claim 1, wherein the data specification comprises:
a canonical format for each of the data fields indicated by the comparison request;
a description for each of the data fields;
an indication of a hashing algorithm used to produce hashed verification data; and
a timestamp.

4. The method of claim 1, the method further comprising:
responding to the hashed credentials matching a pre-determined type of hashed data entry by:
determining the eligibility claim is valid.

\* \* \* \* \*